(12) United States Patent
Fajt et al.

(10) Patent No.: US 10,990,169 B2
(45) Date of Patent: Apr. 27, 2021

(54) SYSTEMS AND METHODS FOR ASSISTING VIRTUAL GESTURES BASED ON VIEWING FRUSTUM

(71) Applicant: Rec Room Inc., Seattle, WA (US)

(72) Inventors: Nicholas Fajt, Seattle, WA (US);
Cameron Brown, Seattle, WA (US);
Dan Kroymann, Seattle, WA (US);
Omer Bilal Orhan, Seattle, WA (US);
Johnathan Bevis, Seattle, WA (US);
Joshua Wehrly, Seattle, WA (US)

(73) Assignee: Rec Room Inc., Seattle, WA (US)

( * ) Notice: Subject to any disclaimer, the term of this patent is extended or adjusted under 35 U.S.C. 154(b) by 0 days.

(21) Appl. No.: 16/313,821

(22) PCT Filed: Jun. 28, 2017

(86) PCT No.: PCT/US2017/039824
§ 371 (c)(1),
(2) Date: Dec. 27, 2018

(87) PCT Pub. No.: WO2018/005690
PCT Pub. Date: Jan. 4, 2018

(65) Prior Publication Data
US 2019/0155384 A1    May 23, 2019

Related U.S. Application Data

(60) Provisional application No. 62/355,788, filed on Jun. 28, 2016.

(51) Int. Cl.
*G06F 3/01* (2006.01)
*G06F 3/0481* (2013.01)
(Continued)

(52) U.S. Cl.
CPC .............. *G06F 3/013* (2013.01); *A63F 13/21* (2014.09); *A63F 13/211* (2014.09);
(Continued)

(58) Field of Classification Search
CPC combination set(s) only.
See application file for complete search history.

(56) References Cited

U.S. PATENT DOCUMENTS 9,323,325 B2    4/2016   Perez et al.
9,345,957 B2    5/2016   Geisner et al.
(Continued)

OTHER PUBLICATIONS

Chatterjee, I., et al., "Gaze+Gesture: Expressive, Precise and Targeted Free-Space Interactions," Proceedings of the 2015 ACM on International Conference on Multimodal Interaction, Nov. 9-13, 2015, Seattle, pp. 131-138.
(Continued)

*Primary Examiner* — Robin J Mishler
(74) *Attorney, Agent, or Firm* — Christensen O'Connor Johnson Kindness PLLC

(57) ABSTRACT

An endpoint system including one or more computing devices presents an object in a virtual environment (e.g., a shared virtual environment); receives gaze input corresponding to a gaze of a user of the endpoint system; calculates a gaze vector based on the gaze input; receives motion input corresponding to an action of the user; determines a path adjustment (e.g., by changing motion parameters such as trajectory and velocity) for the object based at least in part on the gaze vector and the motion input; and simulates motion of the object within the virtual environment based at least in part on the path adjustment. The object may be presented as being thrown by an avatar, with a flight path based on the path adjustment. The gaze vector may be based on head orientation information, eye tracking infor- (Continued)

mation, or some combination of these or other gaze information.

20 Claims, 18 Drawing Sheets

(51) Int. Cl.
| | |
|---|---|
| *A63F 13/573* | (2014.01) |
| *A63F 13/212* | (2014.01) |
| *A63F 13/25* | (2014.01) |
| *A63F 13/211* | (2014.01) |
| *A63F 13/35* | (2014.01) |
| *A63F 13/5255* | (2014.01) |
| *A63F 13/21* | (2014.01) |
| *G06F 17/10* | (2006.01) |

(52) U.S. Cl.
CPC ............ *A63F 13/212* (2014.09); *A63F 13/25* (2014.09); *A63F 13/35* (2014.09); *A63F 13/5255* (2014.09); *A63F 13/573* (2014.09); *G06F 3/011* (2013.01); *G06F 3/012* (2013.01); *G06F 3/0481* (2013.01); *G06F 17/10* (2013.01); *A63F 2300/8082* (2013.01)

(56) References Cited

U.S. PATENT DOCUMENTS

| | | |
|---|---|---|
| 9,377,863 B2 | 6/2016 | Bychkov et al. |
| 9,442,567 B2 | 9/2016 | Scott et al. |
| 2012/0257035 A1* | 10/2012 | Larsen .................... G06F 3/013 348/78 |
| 2014/0204193 A1 | 7/2014 | Zhang et al. |
| 2014/0237366 A1 | 8/2014 | Poulos et al. |
| 2014/0372957 A1 | 12/2014 | Keane et al. |
| 2016/0026242 A1 | 1/2016 | Burns et al. |
| 2016/0274762 A1 | 9/2016 | Lopez et al. |
| 2016/0309081 A1 | 10/2016 | Frahm et al. |
| 2017/0061817 A1 | 3/2017 | Mettler May |
| 2018/0048978 A1* | 2/2018 | Suenaga ................. G06F 3/012 |

OTHER PUBLICATIONS

Hollomon, M.J., et al., "Current Status of Gaze Control Research and Technology Literature Review," Final Report, Civil Aerospace Medical Institute, Federal Aviation Administration (FAA), Office of Aerospace Medicine, Washington, DC, Jan. 2017, 38 pages.

International Search Report and Written Opinion dated Oct. 26, 2017, issued in corresponding International Application No. PCT/US2017/039824, filed Jun. 28, 2017, 9 pages.

McManus, E.A., et al., "Perceiving Alterations in Trajectories While Throwing in a Virtual Environment," Proceedings pf the ACM SIGGRAPH Symposium on Applied Perception in Graphics and Visualization (APGV '11), Aug. 27-28, 2011, Toulouse, France, pp. 23-28.

Tobii, "Towards Immersive Virtual Reality," White Paper, n.d., 5 pages.

Unity, "Interaction in VR," ©2017 Unity Technologies, <https://unity3d.com/learn/tutorials/topics/virtual-reality/interaction-vr> [retrieved Jun. 16, 2017], 29 pages.

Zeleznik, R.C., et al., "Look-That-There: Exploiting Gaze in Virtual Reality Interactions," Technical Report CS-05, 2005, 7 pages.

* cited by examiner

SYSTEMS AND METHODS FOR ASSISTING VIRTUAL GESTURES BASED ON VIEWING FRUSTUM

CROSS-REFERENCE(S) TO RELATED APPLICATION(S)

The present application claims the benefit of Provisional Application No. 62/355,788, filed Jun. 28, 2016, the entire disclosure of which is hereby incorporated by reference herein for all purposes.

The present application is related to International Patent Application No. PCT/US2017/039799, filed Jun. 28, 2017, entitled SYSTEMS AND METHODS FOR TRANSFERRING OBJECT AUTHORITY IN A SHARED VIRTUAL ENVIRONMENT; International Patent Application No. PCT/US2017/039800, filed Jun. 28, 2017, entitled SYSTEMS AND METHOD FOR MANAGING PERMISSION FOR INTERACTING WITH VIRTUAL OBJECTS BASED ON VIRTUAL PROXIMITY; International Patent Application No. PCT/US2017/039801, filed Jun. 28, 2017, entitled SYSTEMS AND METHODS PROVIDING TEMPORARY DECOUPLING OF USER AVATAR SYNCHRONICITY FOR PRESENCE ENHANCING EXPERIENCES; and International Patent Application No. PCT/US2017/039826, filed Jun. 28, 2017, entitled SYSTEMS AND METHODS FOR DETECTING COLLABORATIVE VIRTUAL GESTURES, the entire disclosures of which are hereby incorporated by reference herein for all purposes.

BACKGROUND

Virtual environments such as virtual reality environments, augmented reality environments, and the like, are growing in popularity. However, the ability of virtual environments to accurately model many real-world experiences remains limited by existing technology. Consider a scenario in which a user is engaged in a virtual activity, such as throwing an object at a target. Throwing objects with the human hand is a complex process: the release velocity of objects is a function of arm torque, hand grip, wrist flick, fingertip friction, and many more variables. Typical hand-tracking controllers are extremely simplistic relative to the human hand, and are incapable of reporting many of the throw properties outlined above. In fact, the only information provided by a typical VR controller is position and orientation, linear and angular velocity of the controller's center of mass, and the state of various buttons (if present), such as whether a trigger is depressed or not.

In the illustrative scenario, the hand/arm properties provided by typical controllers are sufficient to build object throwing interactions in virtual environments, but their lack of many hand properties described above means that users are unable to throw virtual objects with the same accuracy and precision as real world objects without unique training. Furthermore, such training may be a barrier to providing an immersive user experience in some contexts, such as entertainment and gaming, in which users expect to immediately participate in an activity without significant practice or training.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In described embodiments, user actions in a virtual environment are assisted based on a gaze vector or viewing frustum. For example, an endpoint system determines a path adjustment (e.g., by changing motion parameters such as trajectory and velocity) for an object based on a gaze vector. The object may be presented, for example, as being thrown by an avatar with an adjusted flight path based on the path adjustment. Other gaze-assisted actions are also described.

In one aspect, an endpoint system including one or more computing devices presents an object in a virtual environment (e.g., a shared virtual environment); receives gaze input corresponding to a gaze of a user of the endpoint system; calculates a gaze vector based on the gaze input; receives motion input corresponding to an action of the user that causes motion of the object in the virtual environment; determines a path adjustment for the object based at least in part on the gaze vector and the motion input; and simulates motion of the object within the virtual environment based at least in part on the path adjustment. The object may be presented in the virtual environment as being thrown by an avatar associated with the endpoint system. The simulated motion can be presented, for example, on a head-mounted display device of the endpoint system. The gaze vector may be based on head orientation information, eye tracking information, or some combination of these or other gaze information. The gaze information may be received from a head-mounted display device.

The endpoint system may calculate a motion vector based on the motion input (e.g., hand motion input received from a handheld controller), wherein the motion vector includes a direction. The endpoint system may compare the direction of the gaze vector and the direction of the motion vector and calculate the path adjustment for the object based on the comparison. The endpoint system may calculate weighting of the gaze vector or weighting of the motion vector based on the comparison. The comparison may include calculating an angle between the directions of the vectors. Weighting of the vectors may be based on the angle. For example, if the angle is greater than a threshold, the gaze vector may be given less weight or ignored.

Determining the path adjustment for the object may include determining whether the gaze vector or a viewing frustum is aligned with a target and, if the gaze vector or viewing frustum is aligned with the target, a path adjustment may be calculated for the object such that the path of the object hits or comes nearer to the target.

The endpoint system may transmit location change notifications for the object (e.g., via a communication relay server) to one or more other endpoint systems via the communication relay server.

In another aspect, an endpoint system presents at least a portion of an avatar in a virtual environment (e.g., a shared virtual environment). The avatar is associated with the endpoint system, and the portion of the avatar is associated with a gaze-activation region. The endpoint system calculates a gaze vector of a user of the endpoint system; determines whether the gaze vector intersects or is within a threshold distance of the gaze-activation region; and presents a user interface within the virtual environment if the gaze vector intersects or is within the threshold distance of the gaze-activation region.

The gaze-activation region may be movable in the virtual environment. For example, the gaze-activation region may be movable along with the portion of the avatar in response to information received from a handheld controller. The gaze-activation region may be represented in the virtual environment as an item worn by the avatar, such as a wristwatch.

The user interface, which may include a plurality of user-selectable elements, may be presented in an initial position based on the position of the portion of the avatar in the virtual environment, and the initial position may be updated such that the user interface moves when the portion of the avatar moves. Or, in response to user input, the user interface may be detached from the portion of the avatar in response to the user input to allow the interface to remain stationary while the avatar moves. The endpoint system may transmit notifications in response to activation of the user-selectable elements, and these notifications may be transmitted to other systems, such as other servers or other endpoint systems, via the communication relay server.

In any of the examples described herein, an endpoint system may include an endpoint computing device; a head-mounted display device communicatively coupled to the endpoint computing device; and at least one handheld controller device communicatively coupled to the endpoint computing device. Corresponding methods and computer-readable media are also described.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the present disclosure are generally directed to systems and methods for assisting gestures or actions in a virtual environment based on gaze information. In such embodiments, activities such as throwing virtual objects may be made more intuitive for users, as throws are assisted by adjusting paths of objects in flight towards a target of the user's gaze. Because humans typically are visually engaged with a target in order to estimate how fast and what direction to throw an object, adjusting the path of an object based on the user's gaze can be helpful. Accordingly, some described embodiments use a gaze vector (e.g., the vector along the center of the user's virtual camera's view frustum) to adjust flight paths of thrown objects in a virtual environment.

In some embodiments, objects are slightly accelerated away from their release trajectory and/or velocity (e.g., as defined by usage of a handheld controller device) towards a trajectory and/or velocity that moves the thrown object along an assisted or adjusted path to the gazed target. A result of this approach is that thrown objects leave the user's virtual hand with a velocity that appears correct to the user and end up at or near where the user intended the object to land, even if its original path would have caused the object to end up in another location. The adjusted path can also be viewed in the virtual environment by other users.

In a simplified technique, the end result of a particular action may depend entirely on gaze (e.g., by determining that a target is aligned with a gaze vector or anywhere within a viewing frustum) coupled with a basic gesture (such as moving a hand forward in a basic throwing motion). However, techniques described herein also may add additional levels of skill or realism. For example, an endpoint system may compare a gaze vector with one or more original motion vectors of the object in order to determine whether, or to what degree, to adjust the path based on how accurate the throw is compared to the gazed target.

Further details of how such techniques may be implemented are provided below, following a description of an illustrative virtual environment and related devices that may be used in accordance with disclosed embodiments.

Illustrative Virtual Environment and Related Devices

The following section includes a description of an illustrative virtual environment and related devices that may be used in accordance with disclosed embodiments. The descriptions in this section provide only an illustrative context for an implementation environment for described embodiments; the details in this section are not required for all embodiments.

Figure 1:
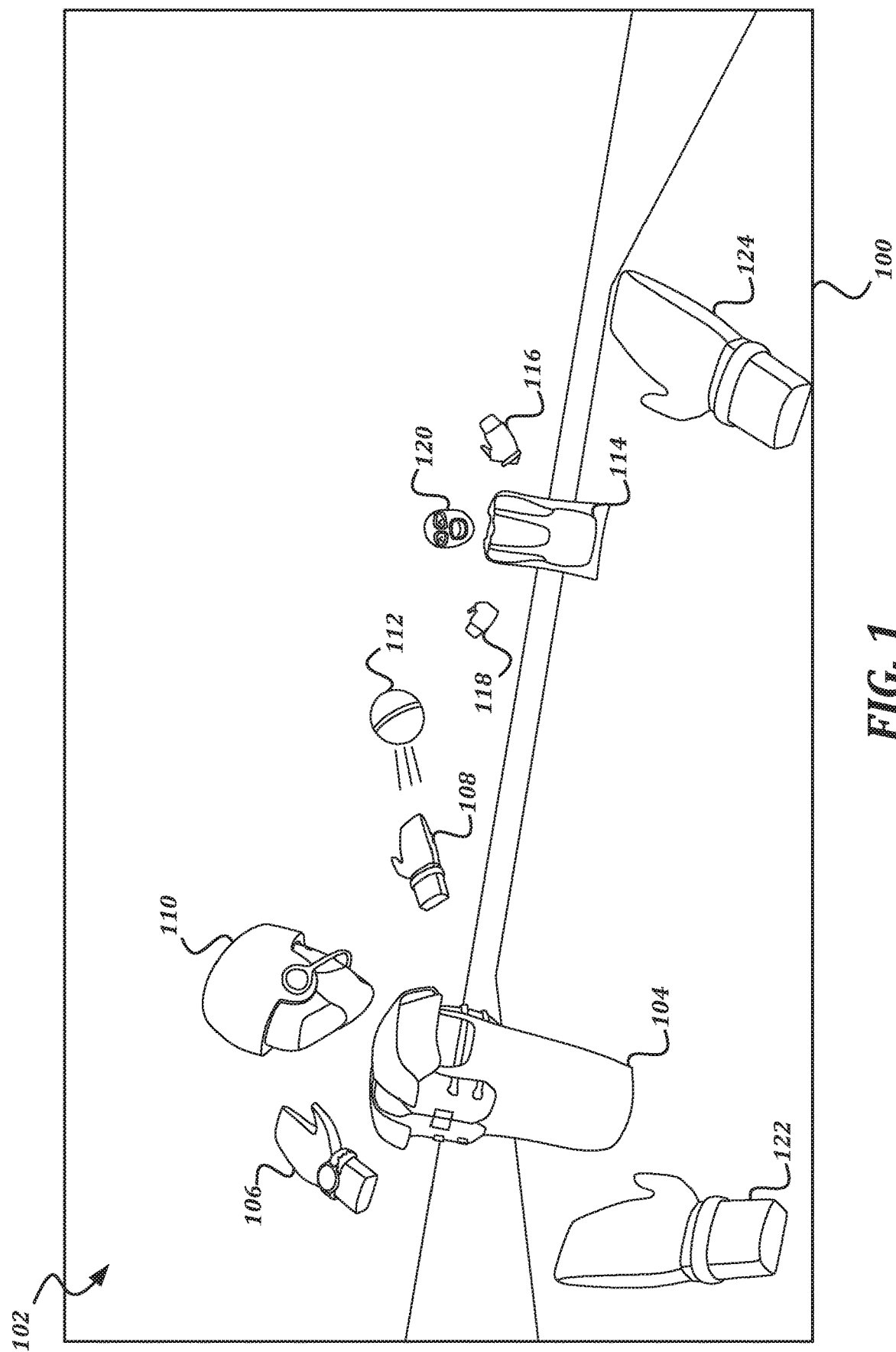
FIG. 1 is an illustration of an example embodiment of a shared virtual environment according to various aspects of the present disclosure.

FIG. 1 is an illustration of an example embodiment of a shared virtual environment according to various aspects of the present disclosure. In FIG. 1, a display 100 of a head-mounted display device is illustrated, showing a view of a shared virtual environment 102 presented to a user via the head-mounted display device. The shared virtual environment 102 is a virtual room in which two or more users may interact with each other and/or with objects within the shared virtual environment through avatars. As shown, the view is a first-person view of the shared virtual environment 102, and two avatars can be seen. A first avatar has a head 110, a torso 104, a left hand 106 and a right hand 108. A second avatar also has a head 120, a left hand 116, a right hand 118, and a torso 114. In the illustrated scene, the first avatar has just thrown a ball 112 towards the second avatar. Because the scene is a first-person view, the user can also see a left hand 122 and a right hand 124 that correspond to the user's own avatar. This scene is an illustrative example to establish context for the rest of the disclosure, and should not be seen as limiting to any specific type of avatar, object, or virtual room.

Figure 2:
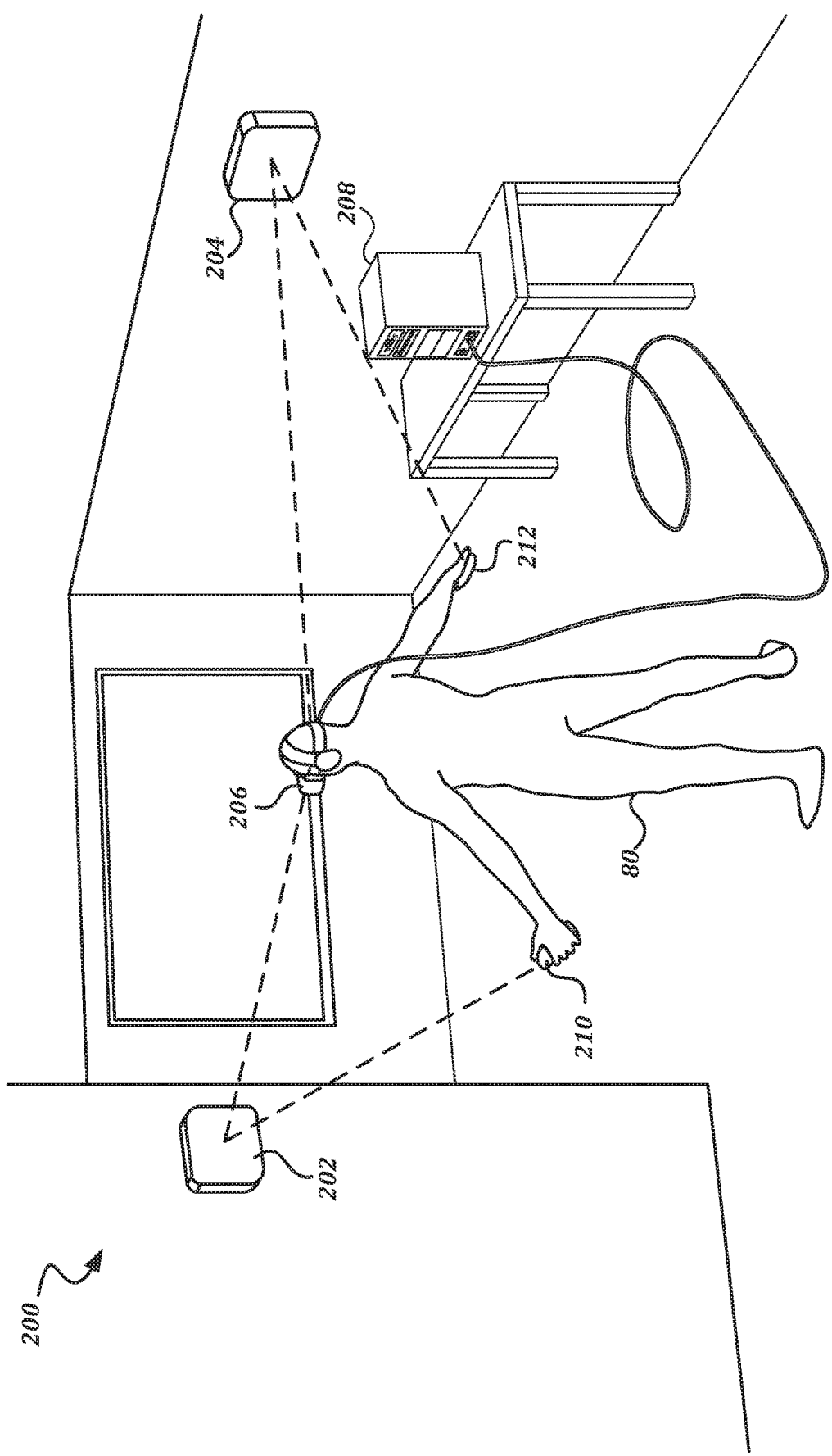
FIG. 2 is an illustration of a user interacting with an example embodiment of an endpoint system according to various aspects of the present disclosure.

Each avatar in the shared virtual environment is associated with an endpoint system. FIG. 2 is an illustration of a user interacting with an example embodiment of an endpoint system according to various aspects of the present disclosure. The user 80 is in a room 200 that has been configured with an endpoint system. An endpoint computing device 208 is connected to a head-mounted display device 206 worn by the user 80 via a cable. The user 80 holds a first handheld controller device 210 in one hand, and a second handheld controller device 212 in the other hand. One or more motion sensor devices 202, 204 are arranged around the room 200, and detect the position and/or motion of the head-mounted display device 206 and the handheld controller devices 210, 212 within the room 200. The endpoint computing device 208 may use the detected positions and/or motions of the handheld controller devices 210, 212 to control the hands of the avatar 122, 124 within the shared virtual environment 102. The endpoint computing device 208 may use the detected positions and/or motions of the head-mounted display device 206 to move the avatar associated with the endpoint system within the shared virtual environment 102, and to move the viewpoint rendered by the head-mounted display device 206 within the shared virtual environment 102. Further details regarding each of these components are provided below.

In order to provide the most immersive experience for users of the shared virtual environment, it is desirable to have the shared virtual environment mimic the real world as much as possible. For instance, it is desirable to make objects within the shared virtual environment move and behave as if they are governed by the rules of Newtonian physics. While physics simulations of virtual objects are common, the use of such simulations in a shared virtual environment is less common. In order to generate a traditional shared virtual environment, a central device would typically be used to simulate each of the virtual objects, and would transmit the state of the objects to endpoint systems for presentation. However, the latency involved in such transmissions can be disorienting and can diminish the immersiveness of the presentation. To improve the experience, embodiments of the present disclosure simulate objects within the shared virtual environment at the endpoint systems so that there is no latency. For a given object, the endpoint system that is interacting with the object is assigned object authority over that object, and generates the physical simulation of the object. That endpoint system then transmits notifications to other endpoint systems to share the state of the object.

Because the virtual environment is shared, objects can be transferred from one avatar to another. This means, for objects that can be transferred from one avatar to another (like a thrown ball, etc.), object authority will need to be transferred from a first endpoint system to a second endpoint system. Further, endpoint systems will need to be able to present objects for which they do not have object authority.

Figure 3:
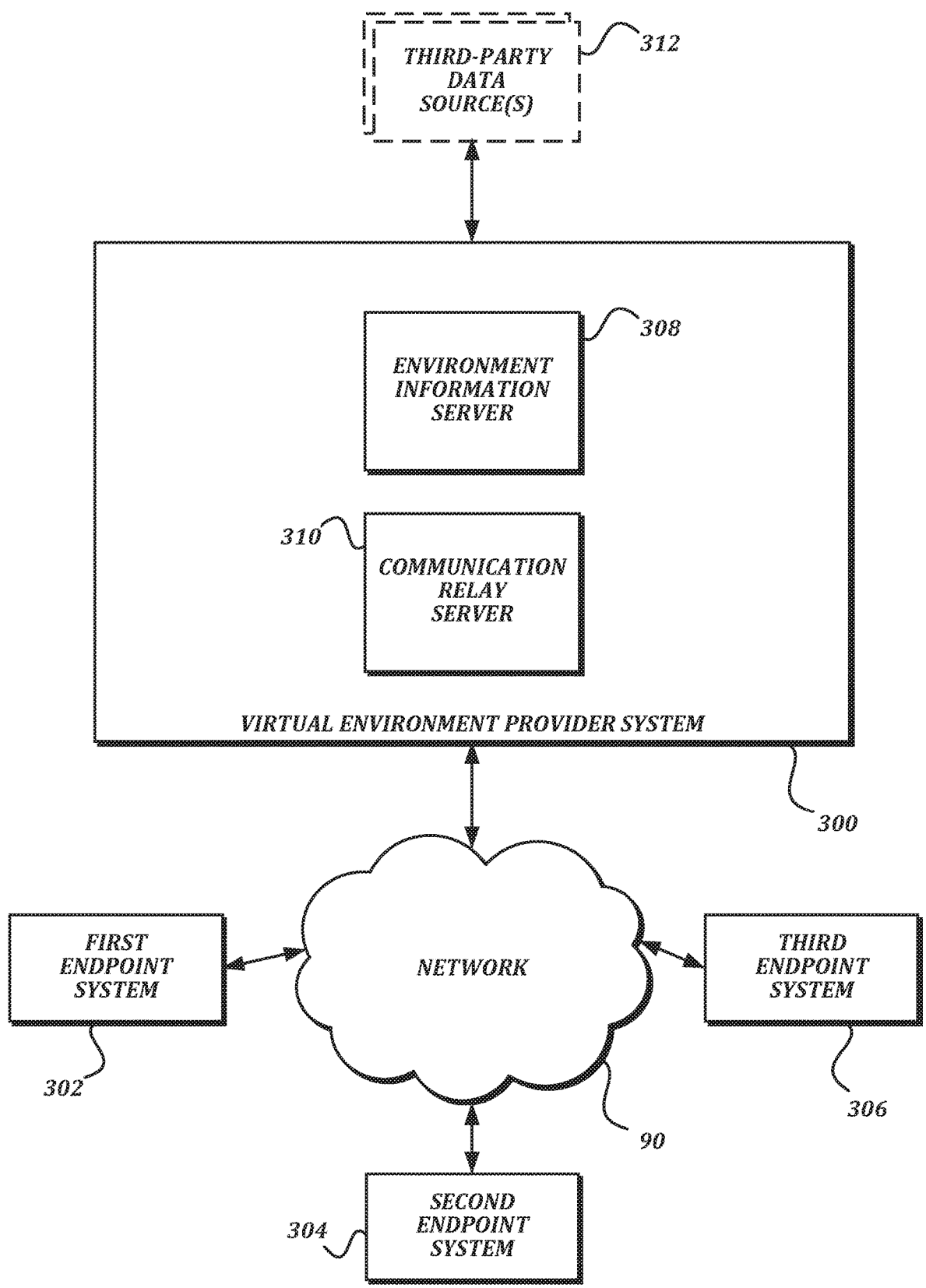
FIG. 3 is a block diagram that illustrates an example embodiment of a virtual environment provider system according to various aspects of the present disclosure.

FIG. 3 is a block diagram that illustrates an example embodiment of a virtual environment provider system according to various aspects of the present disclosure. In the illustrated embodiment, the virtual environment provider system 300 includes an environment information server 308 and a communication relay server 310.

In some embodiments, the environment information server 308 is primarily responsible for managing persistent information relating to providing the shared virtual environment. For example, the environment information server 308 may manage user account information, preferences, long-lived virtual object information, and/or other information. In some embodiments, the communication relay server 310 is primarily responsible for distributing notifications received from endpoint systems to other endpoint systems. The communication relay server 310 may also extract some data for temporary storage from the notifications that pass through it. Further description of the functionality provided by the environment information server 308 and the communication relay server 310 is provided below.

Each server of the virtual environment provider system 300 may be one or more computing devices. In some embodiments, the environment information server 308 and the communication relay server 310 may be merged to be provided by a single computing device. In some embodiments, the virtual environment provider system 300 may include a plurality of computing devices that interchangeably provide the functionality of both servers 308, 310. In some embodiments, the servers 308, 310 of the virtual environment provider system may be provided using a cloud computing service. In some embodiments, the virtual environment provider system 300 may be co-located with (or may be provided by) the same computing devices as one of the endpoint systems 302-306. In some embodiments, the virtual environment provider system 300 is remote from the endpoint systems 302-306.

In the illustrated embodiment, the virtual environment provider system 300 communicates with a plurality of endpoint systems, including a first endpoint system 302, a second endpoint system 304, and a third endpoint system 306 via a network 90. In some embodiments, there may be more or fewer than three endpoint systems communicating with each other and the virtual environment provider system 300, though three are illustrated herein in order to describe the functionality of the system. Connections via the network 90 may be implemented using any combination of suitable wired and/or wireless communication technology, including but not limited to Ethernet, fiber-optics, WiFi, 2G, 3G, LTE, WiMAX, and Bluetooth.

In the illustrated embodiment, the virtual environment provider system 300 may optionally communicate with one or more third-party data sources 312. Third-party data sources 312 may be run by different parties than the virtual environment provider system 300, and may be used to provide enhanced content within the virtual environment provider system 300. Some examples of third-party data sources 312 include, but are not limited to, social networking services, billing services, providers of third-party content such as virtual objects, and media providing services.

Figure 4A:
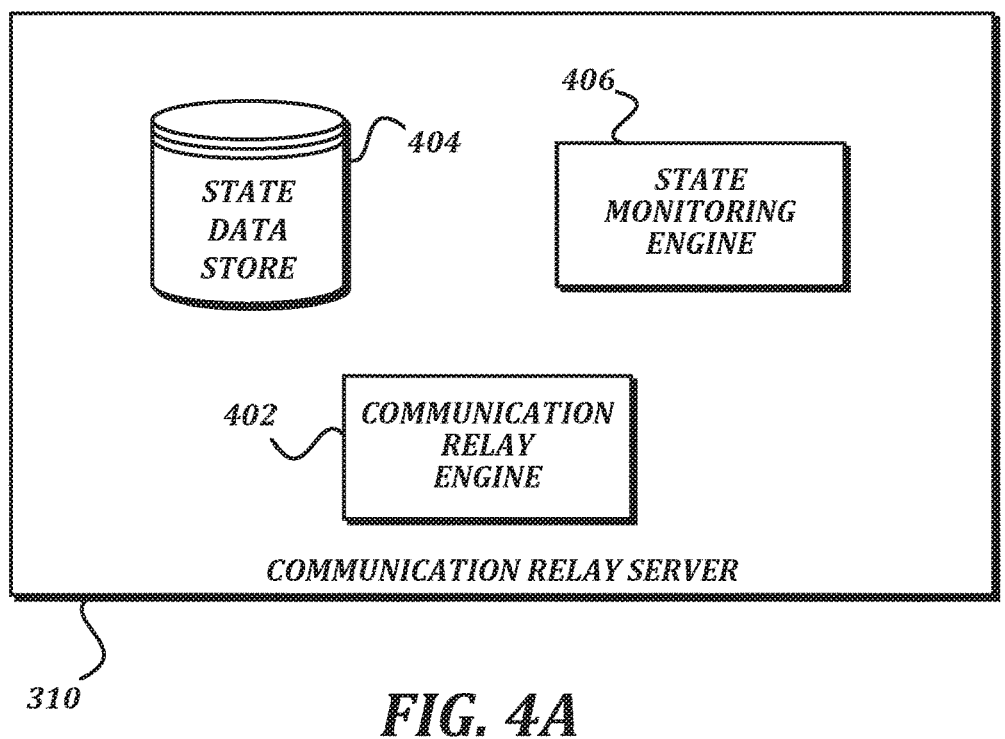
FIG. 4A is a block diagram that illustrates an example embodiment of a communication relay server according to various aspects of the present disclosure.

FIG. 4A is a block diagram that illustrates an example embodiment of a communication relay server according to various aspects of the present disclosure. Typically, bandwidth available to endpoint systems may be asymmetric. That is, a bandwidth available for upload may be significantly less than a bandwidth available for download. While this may not present a significant problem when a first endpoint system 302 and a second endpoint system 304 are the only endpoint systems, the problem arises as additional endpoint systems are added. If notifications were transmitted directly between endpoint systems (instead of via the communication relay server 310), a transmitting endpoint system would have to send an additional notification for each new endpoint system taking part in the shared virtual environment. Hence, as the number of objects for which notifications are transmitted from a first endpoint system 302 and the number of other endpoints both increase, the number of notifications that have to be transmitted by the first endpoint system 302 increases exponentially. This is likely to rapidly consume the available upload bandwidth. To solve this problem, the first endpoint system 302 can send a single notification to the communication relay server 310, and the communication relay server 310 sends it to the other endpoint systems. This helps conserve the limited upload bandwidth available to the first endpoint system 302. Further details of how this transmission may take place are provided below in FIG. 8 and the accompanying text.

In the illustrated embodiment, the communication relay server 310 includes a state monitoring engine 406, a communication relay engine 402, and a state data store 404.

In general, the word "engine," as used herein, refers to logic embodied in hardware and/or software instructions, which can be written in a programming language, such as C, C++, C #, COBOL, JAVA™, PHP, Perl, HTML, CSS, JavaScript, VBScript, ASPX, Microsoft .NET™, and/or the like. An engine may be compiled into executable programs or written in interpreted programming languages. Engines may be callable from other engines or from themselves. Generally, the engines described herein refer to logical components that can be merged with other engines, or can be divided into sub-engines. The engines can be stored in any type of computer-readable medium or computer storage device and be stored on and executed by one or more general purpose computers, thus creating a special purpose computer configured to provide the engine.

As understood by one of ordinary skill in the art, a "data store" as described herein may be any suitable device configured to store data for access by a computing device. One example of a data store is a key-value store. However, any other suitable storage technique and/or device capable of organizing and storing the data may be used, such as a relational database management system (RDBMS), an object database, and/or the like. Other examples of a data store may also include data stored in an organized manner on a computer-readable storage medium, as described further below.

One example of a data store which includes reliable storage, but also low overhead, is a file system or database management system that stores data in files (or records) on a computer-readable medium such as flash memory, random access memory (RAM), hard disk drives, and/or the like. Such a data store may be likely to be used locally by the endpoint computing device 502. One example of a data store is a highly reliable, high-speed RDBMS or key-value store executing on one or more computing devices and accessible over a high-speed packet switched network. Such data stores may be likely to be used by the virtual environment provider system 300. One of ordinary skill in the art will recognize that separate data stores described herein may be combined into a single data store, and/or a single data store described herein may be separated into multiple data stores, without departing from the scope of the present disclosure.

In some embodiments, the communication relay engine 402 is configured to receive notifications from endpoint systems, and to re-transmit those notifications to other endpoint systems. In some embodiments, the state monitoring engine 406 is configured to manage state information held within the state data store 404. In some embodiments, the state monitoring engine 406 may review the notifications received by the communication relay engine 402, and may store information from the notifications in the state data store 404. In some embodiments, the state monitoring engine 406 may ignore information that is ephemeral (including but not limited to location information from location change notifications associated with moving objects), because it will change too quickly to be usefully stored. In some embodiments, the state monitoring engine 406 may wait to store location information in the state data store 404 until the location change notifications indicate that a previously moving object has come to rest. In some embodiments, the state monitoring engine 406 may store information from notifications that is not ephemeral (or at least that changes on a less-frequent basis), such as whether an avatar is present in the shared virtual environment, a score for a game being played, and/or the like. Though each endpoint system should be receiving the notifications from the communication relay engine 402, storing data in the state data store 404 allows an endpoint system that joins the shared virtual environment later to receive initial status upon joining, instead of having to wait to receive notifications from the various endpoint systems to know what objects to present.

Figure 4B:
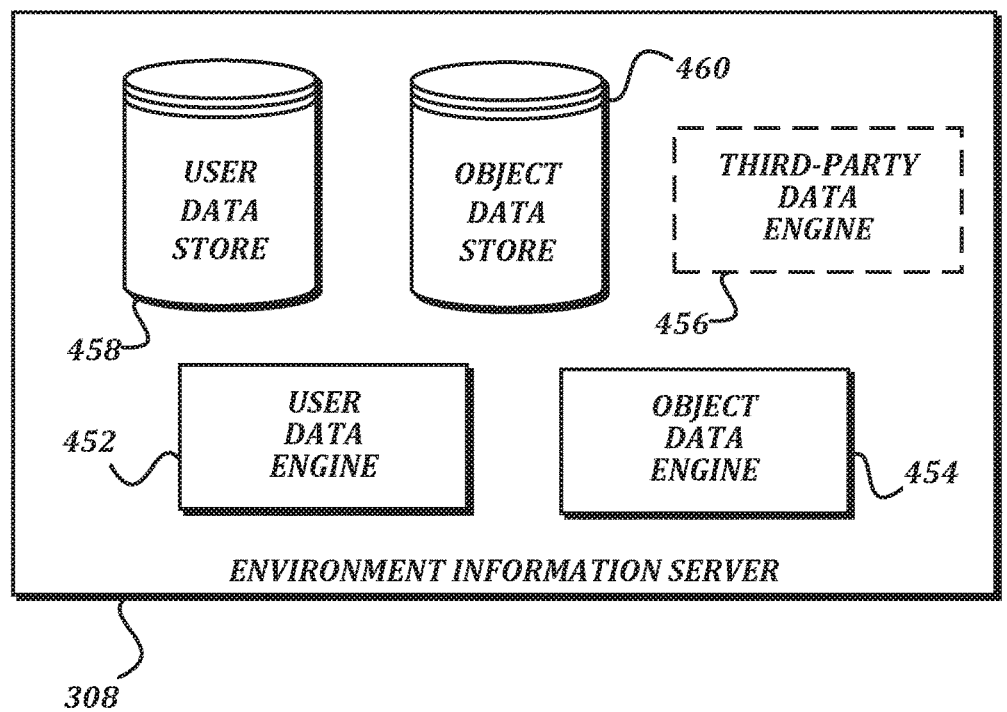
FIG. 4B is a block diagram that illustrates an example embodiment of an environment information server according to various aspects of the present disclosure.

FIG. 4B is a block diagram that illustrates an example embodiment of an environment information server according to various aspects of the present disclosure. In some embodiments, presenting the shared virtual environment will involve shared, immutable objects that can be altered by the environment provider but are otherwise static (such as walls, game logic, and/or the like). Presenting the shared virtual environment may also involve managing user settings, permissions, objects, and the like. While endpoint systems may be suitable for simulating the shared virtual environment for presentation, the intermittent connectivity of endpoint systems makes them unsuitable for managing this type of information. Accordingly, the environment information server 308 may manage and distribute such information.

In the illustrated embodiment, the environment information system 308 includes a user data engine 452, an object data engine 454, an optional third-party data engine 456, a user data store 458, and an object data store 460.

In some embodiments, the user data engine 452 is configured to manage user data within the user data store 458. Some non-limiting examples of user data include unique user identifiers, login and password information, contact information, avatar customization information, preferences, and billing information. The user data may be manipulated through interfaces in the shared virtual environment itself, or through an additional user interface (such as a web-based interface) provided by the environment information server 308.

In some embodiments, the object data engine 454 is configured to manage object data within the object data store 460. The object data may include, but is not limited to, a unique identifier of the object (or an object type); a model representing shape, mass, texture, density, and other physical attributes of the object (or object type); a default location for the object; an owner of the object; and one or more scripts defining behavior of the object.

In some embodiments, the third-party data engine 456 is configured to interact with one or more third-party data sources 312. As some non-limiting examples, the third-party data engine 456 may exchange information with a social network service to allow users within the shared virtual environment to communicate via the social network, to retrieve or upload media or other social postings, and/or for federated authentication. In some embodiments, the third-party data engine 456 may connect with a billing service in order to charge users for access to features within the shared virtual environment. In some embodiments, the third-party data engine 456 may communicate with a third-party content provider to determine whether a given user has access to particular content within the shared virtual environment, or to retrieve such content as requested by the user.

Figure 5:
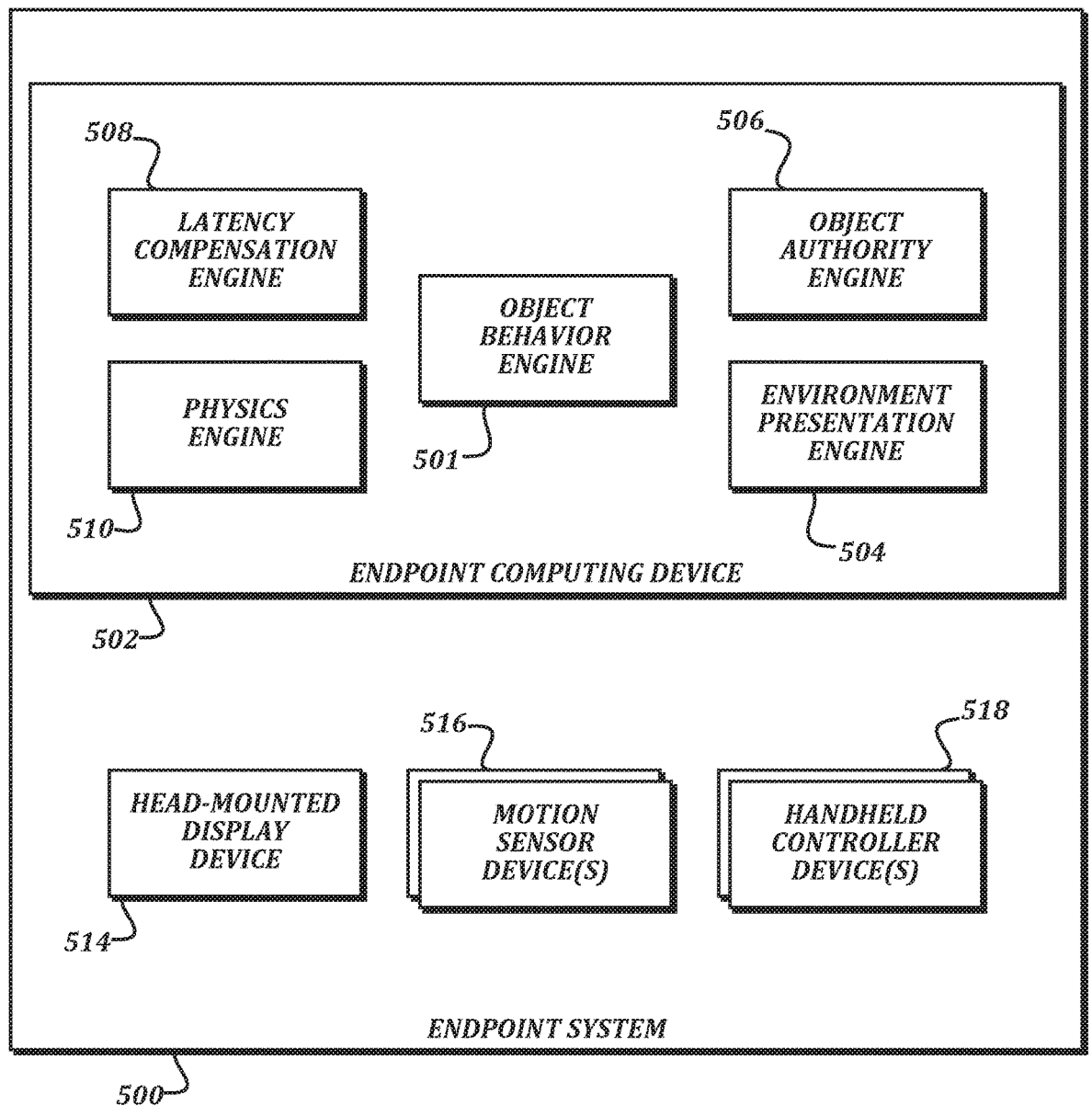
FIG. 5 is a block diagram that illustrates an example embodiment of an endpoint system according to various aspects of the present disclosure.

FIG. 5 is a block diagram that illustrates an example embodiment of an endpoint system according to various aspects of the present disclosure. In the illustrated embodiment, the endpoint system 500 includes an endpoint computing device 502, a head-mounted display device 514, one or more motion sensor devices 516, and one or more handheld controller devices 518.

In some embodiments, the endpoint computing device 502 may be a desktop computing device, a laptop computing device, a tablet computing device, a mobile computing device, or any other type of computing device capable of executing the functionality described herein. The endpoint computing device 502 may have a significant amount of computing and graphic presentation power in order to be able to both execute all of the engines and drive the presentation on the head-mounted display device 514 at a consistently high frame rate. To provide this power, the endpoint computing device 502 may have specialized processors, such as a dedicated graphics card, a physics processing unit, and/or the like.

In some embodiments, the head-mounted display device 514 includes one or more screens, and is configured to be worn on a user's head such that an immersive view of the screens is provided. The head-mounted display device 514 may also include one or more speakers (such as headphones or the like) to provide an audio presentation as well as the video presentation provided by the one or more screens. In some embodiments, the handheld controller devices 518 include one or more input devices such as buttons, trackpads, directional pads, analog sticks, capacitive sensors, and the like. In some embodiments, one of the input devices of the handheld controller devices 518 may be a trigger button. In some embodiments, the handheld controller devices 518 may detect finger states or positions without requiring buttons to be actuated. In some embodiments that are referred to as virtual reality, the head-mounted display device 514 may be opaque, and the screens are the only thing that the user sees during use. In some embodiments that are referred to as augmented reality, the head-mounted display device 514 may have a translucent or transparent display screen, and may allow the user to see objects in the real world along with the objects in the shared virtual environment.

In some embodiments, the motion sensor devices 516 independently detect motion of one or more of the head-mounted display device 514, the handheld controller devices 518, and the user. The motion sensor devices 516 may use any suitable technology to detect the motion, including but not limited to accelerometers, magnetometers, gyroscopes, infrared lasers, depth cameras, photosensors, and computer vision. In some embodiments, multiple motion sensor devices 516 may be located around a room in which the endpoint system 500 is located in order to detect the motion of the head-mounted display device 514, the handheld controller devices 518, and/or the user. In some embodiments, at least some of the motion sensor devices 516 may be incorporated into other devices (such as an accelerometer, magnetometer, and/or gyroscope integrated within the head-mounted display device 514 or handheld controller devices 518.

In some embodiments, the endpoint computing device 502 may be communicatively coupled to the head-mounted display device 514, the motion sensor devices 516, and the handheld controller devices 518 using any suitable communication technology. For example, for the connections between the endpoint computing device 502 and the head-mounted display device 514 or the motion sensor devices 516, high reliability and bandwidth may be desired, and so a suitable high-bandwidth wired communication technique (such as USB 3.0, Thunderbolt, Ethernet, and/or the like) may be used. As another example, for the connections between the endpoint computing device 502 and the handheld controller devices 518, mobility may be a greater concern than bandwidth, and so a wireless communication technique (such as Bluetooth, WiFi, radio frequency (RF) communication, and/or the like) may be used.

In some embodiments, the endpoint computing device 502 is responsible for generating the presentation of the shared virtual environment to the user, for managing the behavior of objects within the shared virtual environment as presented to the user, and for communicating state updates and other environment information with the virtual environment provider system 300 and other endpoint systems. In the illustrated embodiment, the endpoint computing device 502 is configured to provide a latency compensation engine 508, a physics engine 510, an object authority engine 506, and an environment presentation engine 504 in order to provide this functionality.

In some embodiments, the environment presentation engine 504 generates presentations of objects in the shared virtual environment to the user. In some embodiments, the environment presentation engine 504 may generate at least one video feed that includes the presentation of the objects, and provides the at least one video feed to the head-mounted display device 514 to be displayed. In some embodiments, the environment presentation engine 504 may also generate at least one audio feed to be presented via the head-mounted display device 514.

In some embodiments, the physics engine 510 provides a real-time simulation of physical behavior of the objects in the shared virtual environment. As known to one of ordinary skill in the art, a physics engine 510 may provide the simulation by conducting collision detection/collision response actions, rigid body and/or soft body dynamics, fluid dynamics, and/or other processing to determine how objects would interact within the shared virtual environment. In some embodiments, the physics engine 510 may be implemented in software executing on a CPU of the endpoint computing device 502, in software executing in a hardware-accelerated manner on a graphics processing unit (GPU), in dedicated hardware such as a physics processing unit (PPU), or in any combination thereof. Some nonlimiting examples of physics engines 510 that may be suitable for use with the endpoint system 500 include the PhysX engine by Nvidia, the Havok engine by Microsoft Corporation, and the open source Bullet engine.

In some embodiments, the object behavior engine 501 may determine non-physical behavior of objects within the shared virtual environment. As some non-limiting examples of non-physical behavior, the object behavior engine 501 may determine permissions for interacting with an object, may change object states based on game rules or logic, and may detect meaning embedded in interactions detected by the physics engine 510 and respond accordingly (e.g., providing logic that detects collaborative gestures based on object collisions; determining that a collision between a first object and a second object, such as a Frisbee and a target, indicates that a goal in a game has been achieved, and so on).

As described elsewhere herein, object authority over objects within the shared virtual environment is held by the various endpoint systems. Accordingly, the endpoint system 500 will receive location change notifications from other endpoint systems indicating how objects for which the endpoint system 500 does not have object authority should move. The transmission of these notifications will naturally be delayed by some latency in the network 90. In some embodiments, the latency compensation engine 508 is configured help compensate for this latency so that the presentation of objects by the endpoint system 500 can be substantially synchronized with the presentation of the same objects by other endpoint systems 500. In some embodiments, the latency compensation engine 508 is configured to measure latency between the endpoint system 500 and an endpoint system that transmitted a location change notification. While the physics engine 510 may be used to simulate motion of the object to the location indicated in the location change notification, the latency compensation engine 508 helps determine how stale the transmitted location is, and provides information to the physics engine 510 (or the environment presentation engine 504) to allow the animation of the object motion by the endpoint system 500 to eventually be synchronized with the authoritative object motion at the authoritative endpoint system. The latency compensation engine 508 may also help the endpoint computing device 502 compensate for lost or missed location change notifications. Detailed description of these techniques is provided below.

Because the endpoint system 500 manages object authority for objects within the shared virtual environment, in some embodiments, the object authority engine 506 is provided to do so. In some embodiments, the object authority engine 506 is configured to transmit notifications in order to take over object authority for a given object within the shared virtual environment. In some embodiments, the object authority engine 506 is configured to transmit location change notifications based on the locations generated by the physics engine 510 or the object behavior engine 501 for objects for which the endpoint system 500 has taken over object authority.

As described herein, the engines of the endpoint computing device 502 manage the shared virtual environment using a model-view-controller paradigm. That is, for any given object within the shared virtual environment, a data structure representing a model of the object is maintained by the endpoint computing device 502. The latency compensation engine 508, physics engine 510, object behavior engine 501, and object authority engine 506 make changes to the model of the object and therefore act as controllers. The environment presentation engine 504 generates a presentation based on the model of the object, and therefore acts as a view. In some embodiments, other software design paradigms may be used, and so the functionality described below may be split differently, or may be performed by different engines. In some embodiments, the engines described herein may be combined with each other. In some embodiments, multiple copies of a single engine may be present. In some embodiments, functionality described as originating from a given engine may in other embodiments be performed by a different engine.

In some embodiments, some of the devices illustrated in FIG. 5 may be combined with other devices, or some components may be in different devices than illustrated in FIG. 5. For example, in some embodiments, the physics engine 510 and/or the environment presentation engine 504 may be provided by dedicated devices separate from the endpoint computing device 502, or may be provided by the head-mounted display device 514. In some embodiments, the motion sensor devices 516 may track the hands of the user accurately enough to allow the handheld controller devices 518 to be omitted. The below description will refer to embodiments that use handheld controller devices 518 for the sake of clarity. However, the description should not be seen as limiting the disclosure this embodiment, and should instead be seen as encompassing embodiments wherein the handheld controller devices 518 are missing and corresponding user input is obtained through the motion sensor devices 516 alone.

In some embodiments, commercially available hardware may be used for the head-mounted display device 514, the motion sensor devices 516, and the handheld controller devices 518. Some nonlimiting examples of such hardware include the Rift headset and Touch controllers from Oculus VR, LLC; the HTC Vive headset and SteamVR controllers from HTC and Valve Corporation; and the HoloLens headset from Microsoft Corporation. While these examples are provided, one of ordinary skill in the art will understand that the examples are not intended to be limiting, but that other hardware from other manufacturers may instead be used in some embodiments of the present disclosure.

Figure 6:
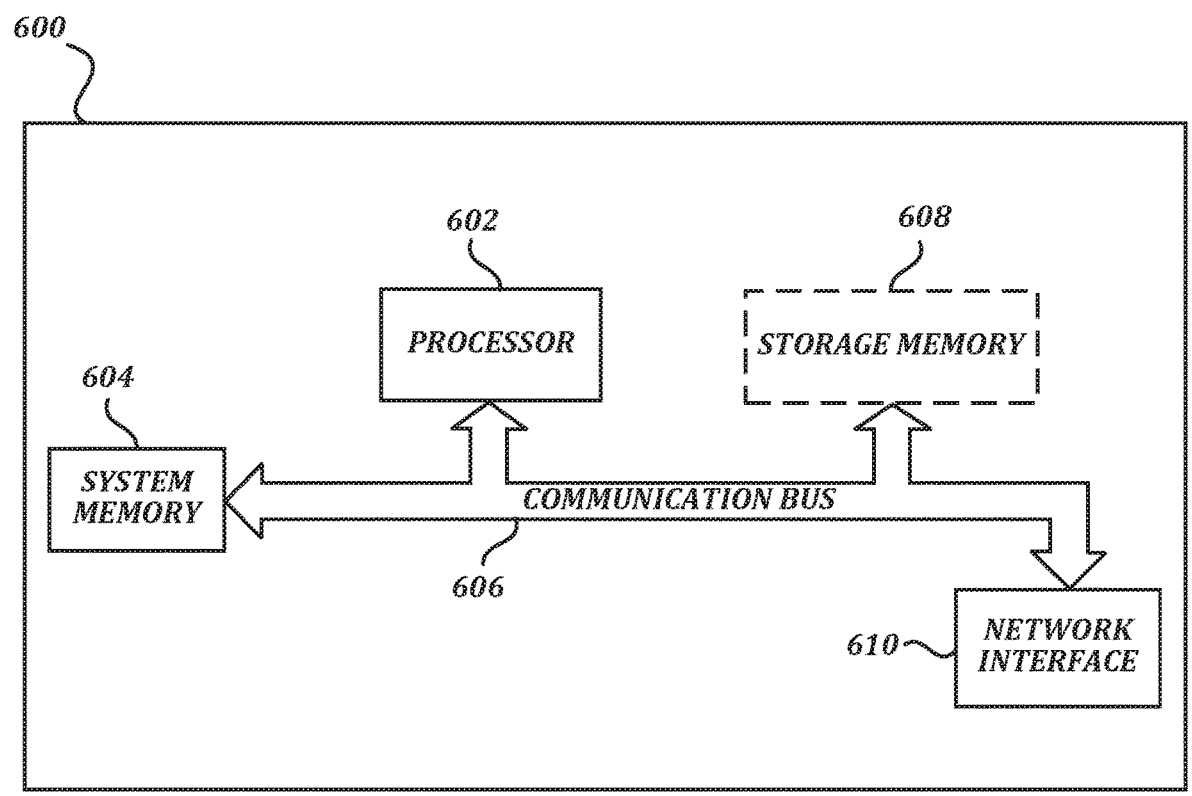
FIG. 6 is a block diagram that illustrates aspects of an exemplary computing device appropriate for use with embodiments of the present disclosure.

FIG. 6 is a block diagram that illustrates aspects of an exemplary computing device appropriate for use with embodiments of the present disclosure. While FIG. 6 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, LTE, WiMAX, Bluetooth, and/or the like.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer-readable instructions, data structures, program modules, or other data. In this regard, the system memory 604 and storage medium 608 depicted in FIG. 6 are merely examples of computer-readable media.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include input devices, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, USB, or other suitable connections protocols using wireless or physical connections. Similarly, the computing device 600 may also include output devices such as a display, speakers, printer, etc. Since these devices are well known in the art, they are not illustrated or described further herein. Unless specifically defined herein, all terms used herein have the same meaning as they would to one skilled in the art of the present disclosure.

Figure 7A:
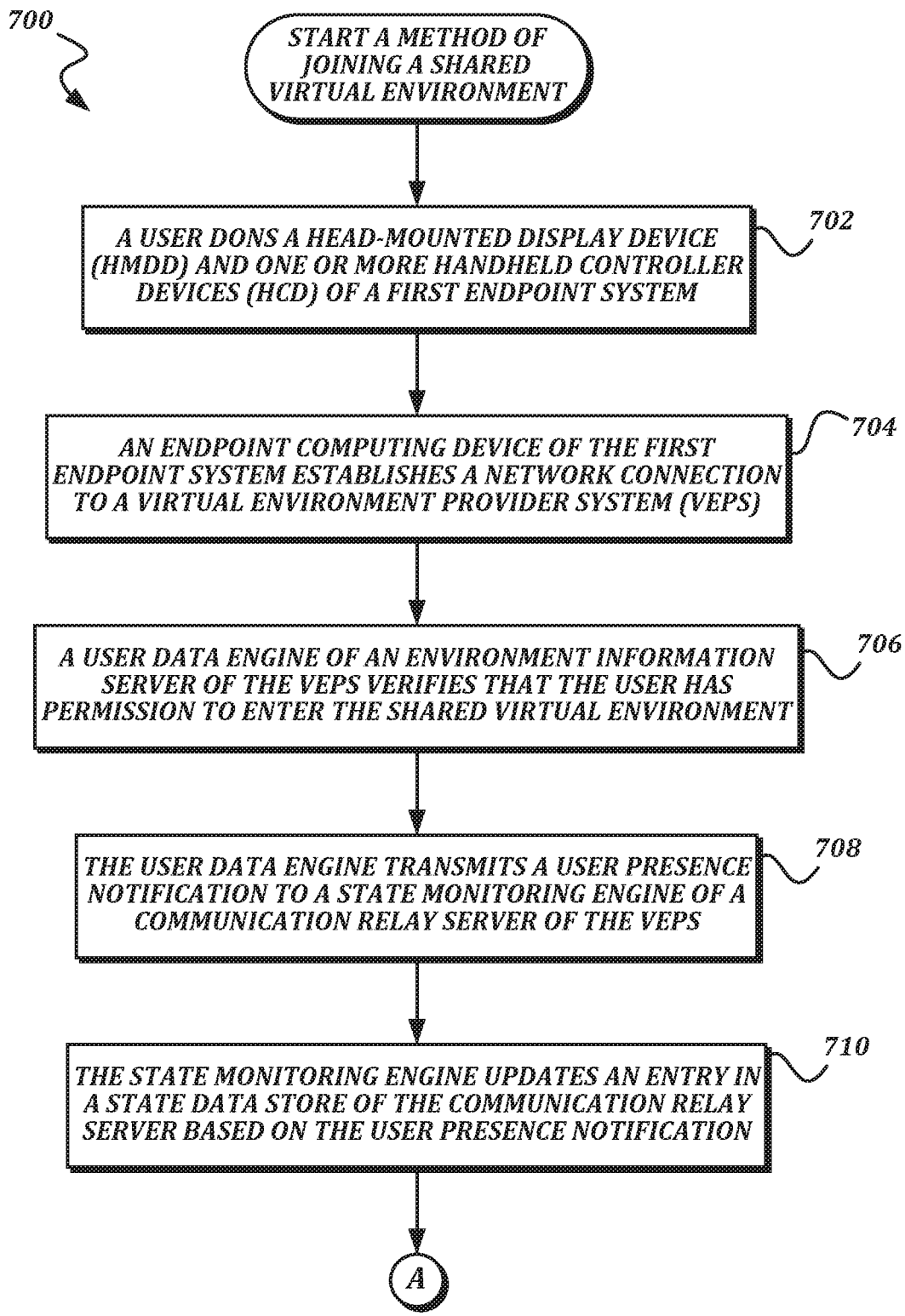
FIGS. 7A-7B are a flowchart that illustrates an example embodiment of a method of joining a shared virtual environment according to various aspects of the present disclosure.
Figure 7B:
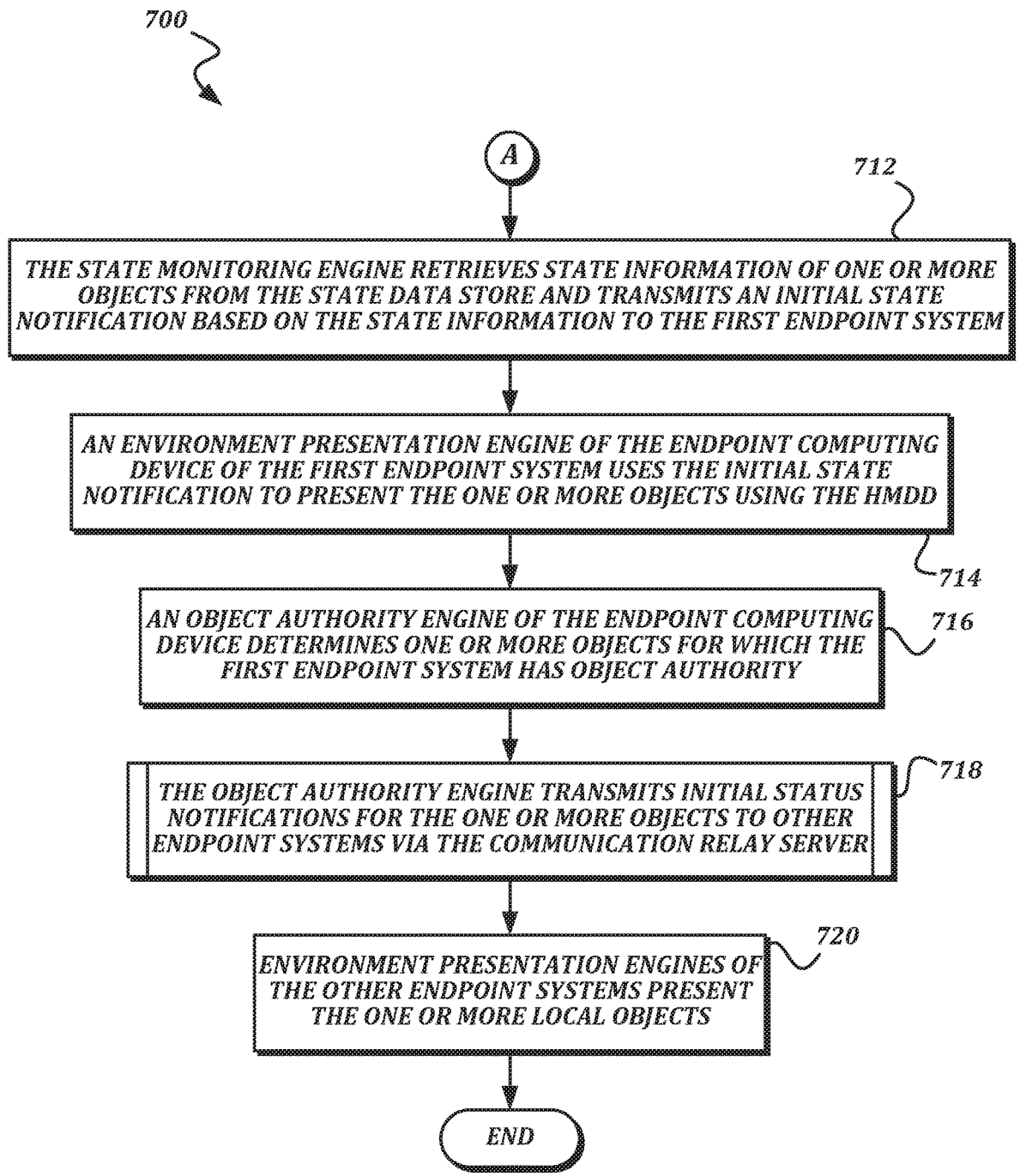

FIGS. 7A-7B are a flowchart that illustrates an example embodiment of a method of joining a shared virtual environment according to various aspects of the present disclosure. From a start block, the method 700 proceeds to block 702, where a user dons a head-mounted display device (HMDD) 514 and one or more handheld controller devices (HCD) 518 of a first endpoint system 302. At block 704, an endpoint computing device 502 of the first endpoint system 302 establishes a network connection to a virtual environment provider system (VEPS) 300. In some embodiments, establishing the network connection to the virtual environment provider system 300 may include a clock synchronization handshake, an exchange of user credentials, an exchange of encryption keys, and/or transmission of other information for establishing the connection. Next, at block 706, a user data engine 452 of an environment information server 308 of the virtual environment provider system 300 verifies that the user has permission to enter the shared virtual environment. In some embodiments, the user data engine 452 may check user credentials submitted in block 704 against an entry in the user data store 458 in order to verify permission. In some embodiments, permission may also be conditioned on aspects of the network connection itself, such as having at least a minimum amount of bandwidth and/or having no more than a maximum allowable latency.

Once permission is verified, the method 700 proceeds to block 708, where the user data engine 452 transmits a user presence notification to a state monitoring engine 406 of a communication relay server 310 of the virtual environment provider system 300. At block 710, the state monitoring engine 406 updates an entry in a state data store 404 of the communication relay server 310 based on the user presence notification. In some embodiments, storing information from the user presence notification in the state data store 404 allows the communication relay server 310 to quickly inform newly connecting endpoint systems 500 about which other endpoint systems 500 are currently participating in the shared virtual environment. The entry may include a network address (such as an IP address and/or the like) by which notifications can be sent to the first endpoint system 302.

The method 700 then proceeds to a continuation terminal ("terminal A"). From terminal A (FIG. 7B), the method 700 proceeds to block 712, where the state monitoring engine 406 retrieves state information of one or more objects from the state data store 404 and transmits an initial state notification based on the state information to the first endpoint system 302. The initial state notification may include the last stored location, velocity, and/or other aspects of the objects. At block 714, an environment presentation engine 504 of the first endpoint system 302 uses the initial state notification to present the one or more objects using the head-mounted display device 514. The initial state notification allows the environment presentation engine 504 of the first endpoint system 302 to know where the objects should be presented within the shared virtual environment. In some embodiments, the initial state notification may include object identifiers for the objects, and the first endpoint system 302 may retrieve models, textures, logic, or other detailed information about the objects from the object data engine 454 of the environment information server 308. In some embodiments, the initial state notification may include the models, textures, logic, or other detailed information about the objects. In some embodiments, the detailed information about the objects may already be present on the first endpoint system 302, and an object identifier in the initial state notification is enough for the first endpoint system 302 to understand how to present the object.

Figure 8:
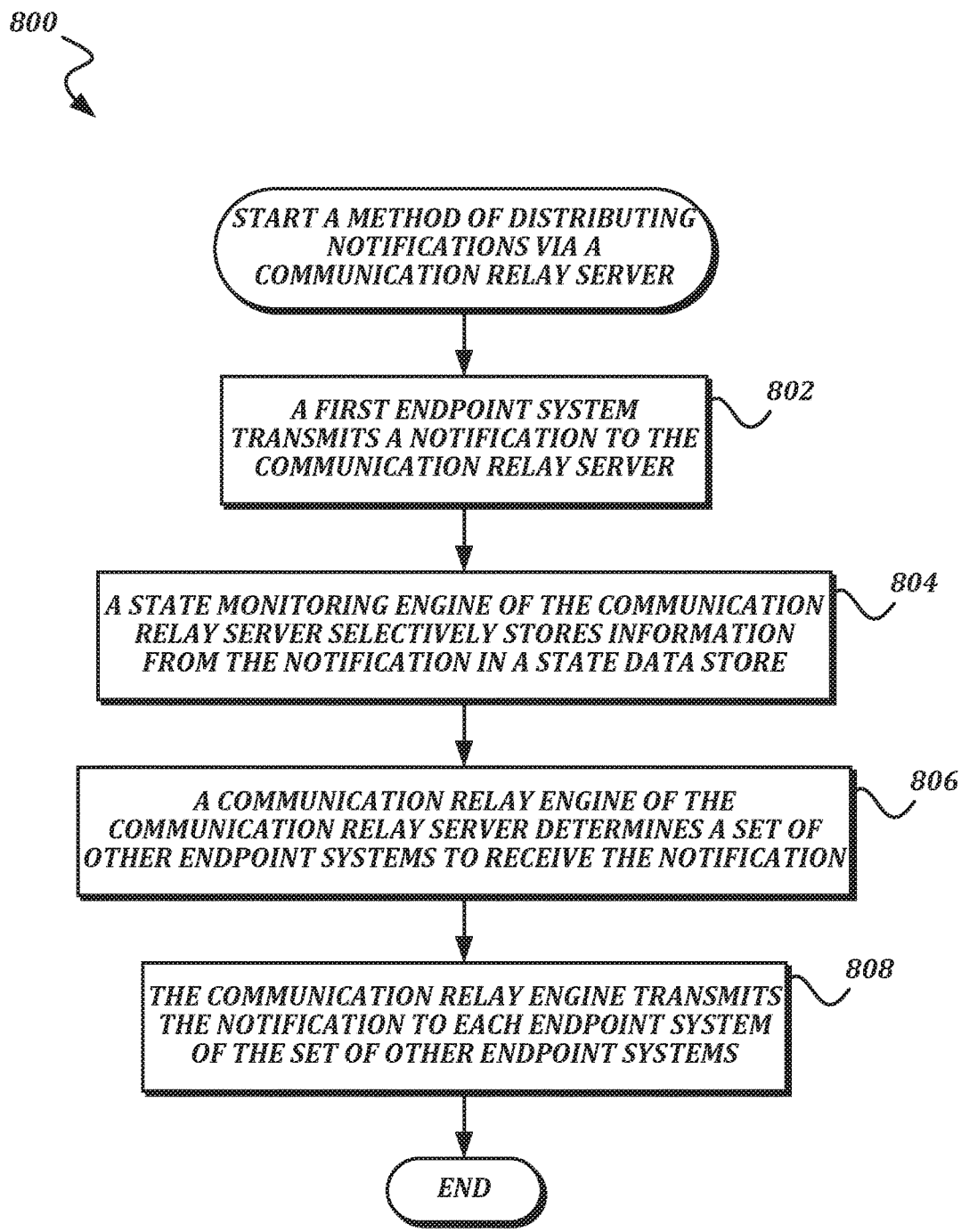
FIG. 8 is a flowchart that illustrates an example embodiment of a method of distributing notifications via a communication relay server according to various aspects of the present disclosure.

At block 716, an object authority engine 506 of the endpoint computing device 502 determines one or more objects for which the first endpoint system 302 has object authority. The objects for which the first endpoint system 302 has object authority include at least objects associated with movement of an avatar associated with the first endpoint system 302. For example, in some embodiments, the first endpoint system 302 may initially have object authority over a head object and two hand objects that are associated with the avatar. In some embodiments, the first endpoint system 302 may also initially have object authority over other objects from the initial state notification that are positioned close to the avatar. The method 700 then proceeds to procedure block 718, where the object authority engine 506 transmits initial status notifications for the one or more objects to other endpoint systems via the communication relay server 310. Any suitable technique for transmitting the notifications via the communication relay server 310 may be used. An example method suitable for use in procedure block 718 is illustrated in FIG. 8 and described in the accompanying text. At block 720, environment presentation engines 504 of the other endpoint systems 500 present the one or more local objects. The presentations on the other endpoint systems 500 use the initial status notifications to determine where to present the objects. The method 700 then proceeds to an end block and terminates. Once the method 700 has concluded, the user of the first endpoint system 302 has entered the shared virtual environment. The first endpoint system 302 will continue to present the shared virtual environment after the method 700 completes.

FIG. 8 is a flowchart that illustrates an example embodiment of a method of distributing notifications via a communication relay server according to various aspects of the present disclosure. As stated above, the method 800 is suitable for use in procedure block 718, as well as in other appropriate procedure blocks throughout the present disclosure. The method 800 may be used to reduce bandwidth requirements, particularly on asymmetric connections at the endpoint systems where upload bandwidth is more limited than download bandwidth.

From a start block, the method 800 proceeds to block 802, where a first endpoint system 302 transmits a notification to the communication relay server 310. Next, at block 804, a state monitoring engine 406 of the communication relay server 310 selectively stores information from the notification in a state data store 404. In some embodiments, the state monitoring engine 406 only stores information from notifications that are not merely ephemeral. For example, the state monitoring engine 406 may not store information from location change notifications, because the information is likely to change very quickly, and the overhead of storing the information in the state data store 404 would not be worth it. However, if the state monitoring engine 406 determines that a location change notification indicates that an object has come to rest (for example, the location information in two or more consecutive location change notifications is identical, or the velocity in a location change notification is zero), the state monitoring engine 406 may store such information in the state data store 404 because it is not likely to change soon. This may also be useful because if a new endpoint system joins the shared virtual environment after the object has come to rest, the new endpoint system would have no other way of knowing the location of the object unless the state monitoring engine stores the location in the state data store 404 and provides it with the initial state notification, because the new endpoint system would not have received any of the past location change notifications. As another example, the state monitoring engine 406 may store other information that is not as ephemeral as location, including but not limited to grab status, game scores, game event notifications, and/or the like.

At block 806, a communication relay engine 402 of the communication relay server 310 determines a set of other endpoint systems to receive the notification. In some embodiments, the communication relay engine 402 may determine which other endpoint systems are participating in the shared virtual environment by checking the entries in the state data store 404, and may use the entries to determine network addresses at which the other endpoint systems can receive communication. Next, at block 808, the communication relay engine 402 transmits the notification to each endpoint system of the set of other endpoint systems. The transmission may use the network addresses that were retrieved from the entry in the state data store 404. The method 800 then proceeds to an end block and terminates.

In the method 800, any suitable transmission technique may be used for the notifications in blocks 802 and 808. In some embodiments, the notifications may be transmitted using a connectionless transmission technique that is appropriate for time-sensitive applications. One suitable technique is the use of user datagram protocol (UDP) packets, though other techniques could be used. The description above of method 800 refers to a "first endpoint system" for clarity. One of ordinary skill in the art will recognize that this method 800 could be used by any endpoint system described herein.

Illustrative Techniques for Assisting Virtual Actions Based on Viewing Frustum

Illustrative techniques for assisting virtual actions or gestures based on gaze vectors or viewing frustum will now be described. Many tasks discussed herein are described as being performed by particular engines, e.g., of an endpoint system. These descriptions are for the purposes of illustration only, and it should be understood that tasks described as being performed by a particular engine (such as an environment presentation engine) may instead be performed by some other engine in accordance with the principles described herein.

First, illustrative techniques for presenting simulated motion of an object based on gaze information in a virtual environment will be described. In an illustrative scenario, a user throws a virtual object in an attempt to land it near a target on a virtual playing field. At the release point, the path of the virtual object is based on the user's hand motion. (In practice, the original path or landing area also may be determined based on other factors modeled in the virtual environment, such as characteristics of the object, effects of gravity and wind, elevation changes on the virtual playing field, etc.) An endpoint system calculates an adjustment that changes the trajectory and/or velocity of the object. Barring any unexpected collisions or interference, the virtual object travels along an adjusted path to a position at or near the target in a way that feels natural to the user at the release point but also improves the accuracy of the throw. One or more of the motion parameters (e.g., trajectory, velocity) are adjusted according to a function that results in a path that ends at or near the target. The adjustments to the relevant parameters may take place over a short period of time, after which the physics engine can process the flight of the object as normal based on the adjusted parameters.

Figure 9A:
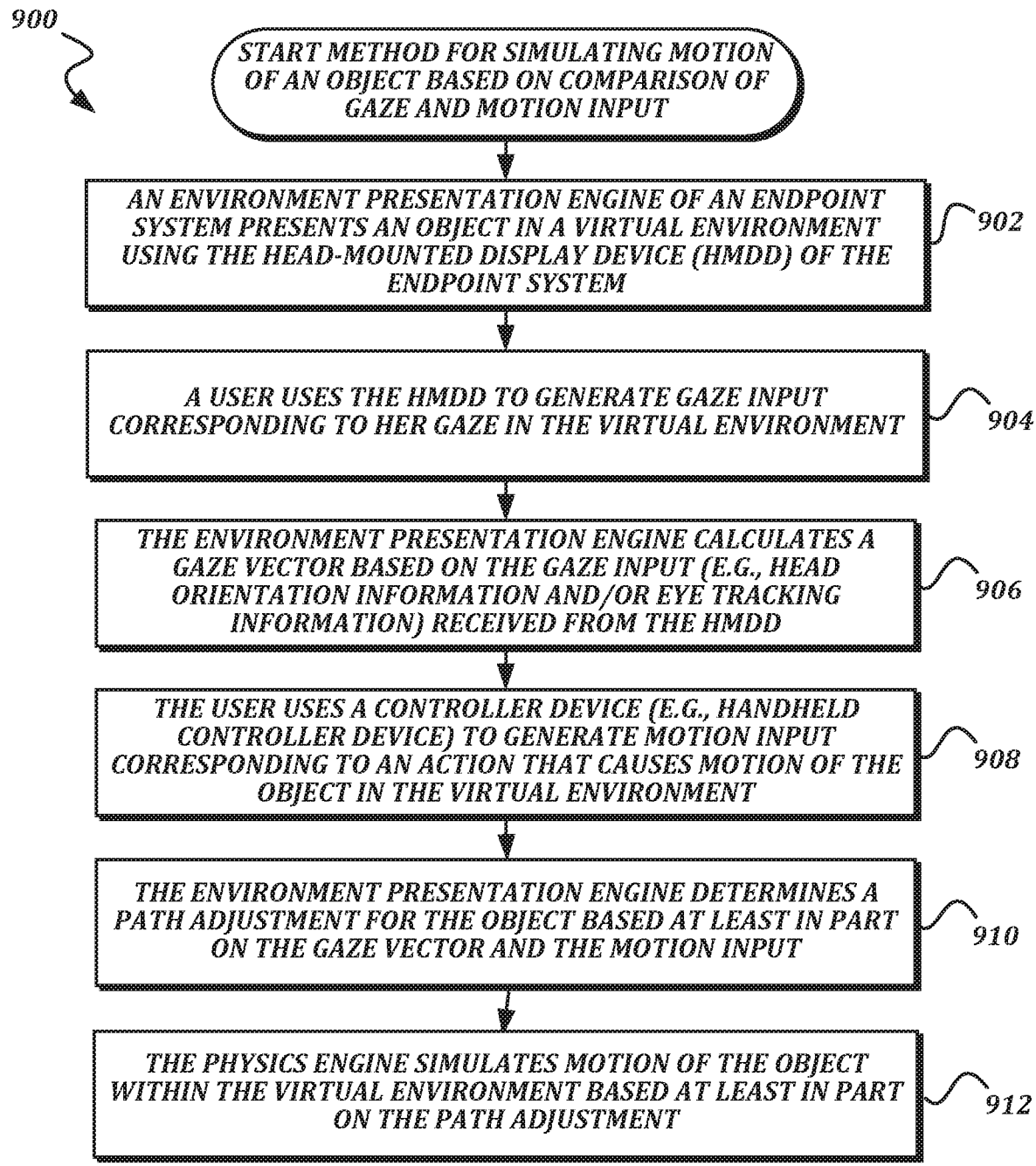
FIGS. 9A-9B are a flowchart that illustrates an example embodiment of a method of simulating motion of an object based on comparison of gaze information and motion input according to various aspects of the present disclosure.
Figure 9B:
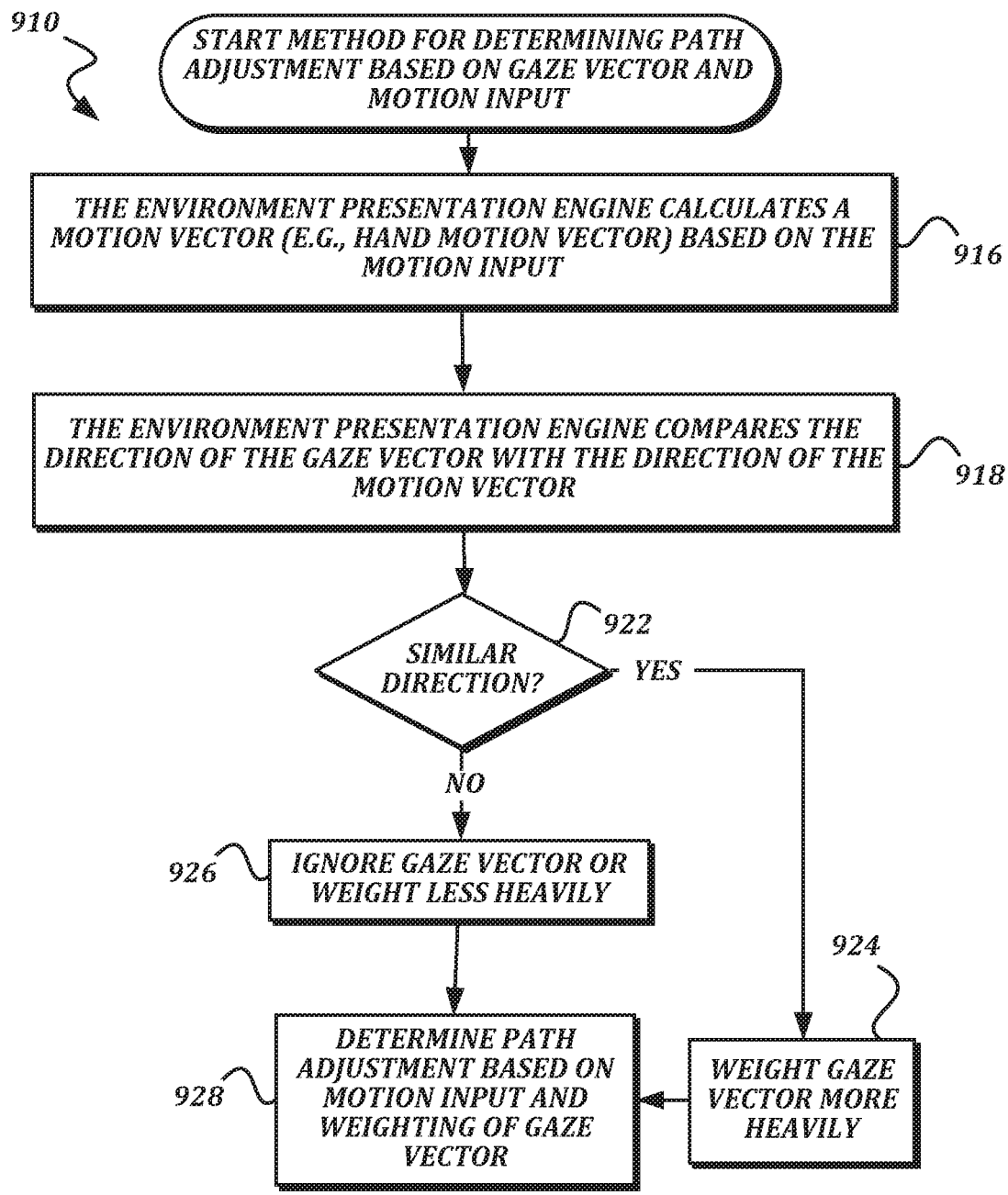

FIGS. 9A-9B are a flowchart that illustrates an example embodiment of a method of simulating motion of an object based on comparison of gaze information and motion input. Although the flowchart of FIGS. 9A-9B refers to hand-oriented actions such as throwing a ball or disc, it should be understood that the techniques described in this flowchart and elsewhere herein may be easily adapted to accommodate actions involving other parts of avatars (e.g., a foot kicking a ball) or objects held by avatars (e.g., a racquet hitting a ball, a bow launching an arrow). Furthermore, although some examples discussed herein involve thrown objects, it should be understood that the techniques described in this flowchart and elsewhere herein may be easily adapted to accommodate other types of motion, such as rolling objects (e.g., in a billiards game).

From a start block, the method 900 proceeds to a procedure block 902, wherein an environment presentation engine of an endpoint system 302 presents an object within the virtual environment to a user, e.g., using the head-mounted display device (HMDD) 514 of the endpoint system. The environment presentation engine may present the object as being held by a hand of the avatar. Though not required, the virtual environment may be a shared virtual environment in which multiple avatars are participating in an activity, such as a dodgeball or paintball game.

At block 904, the user generates gaze input (e.g., using the HMDD 514) corresponding to her gaze in the virtual environment. Next, at block 906, the environment presentation engine calculates a gaze vector based on the gaze input. The gaze vector may be calculated based on head orientation information, eye-tracking information, or a combination of head orientation and eye-tracking information. Calculation of the gaze vector may vary depending factors such as overall system preferences, device capabilities, or bandwidth restrictions. An approach that uses only head orientation to calculate a gaze vector may be less precise than an approach that uses eye-tracking, but it may also be less noisy in terms of signal variation and less expensive in terms of processing power and bandwidth. Head orientation may also be useful where eye-tracking capability is not available.

At block 908, the user generates motion input (e.g., using a handheld controller device (HCD) 518) corresponding to an action that causes motion of the object in the virtual environment. Generating motion input may involve using the HCD 518 to move a hand of the avatar, e.g., in a throwing motion. Other techniques for generating motion input (e.g., externally mounted motion sensors that are not in an HCD) also may be used.

At block 910, the environment presentation engine determines a path adjustment for the object based at least in part on the gaze vector and the motion input. The path adjustment includes one or more motion parameters (e.g., trajectory, velocity, or some combination) for the object that may result in a different path for the object in the virtual environment, relative to the original path. In determining the path adjustment, the gaze vector may play a significant role in subsequent motion of the object. Alternatively, the gaze vector may have more limited significance or be ignored. Illustrative approaches for determining path adjustment based on gaze vectors are described in further detail below.

In one approach, a vector weighting technique is used to determine path adjustment. In one example of this approach, the determination of path adjustment in block 910 proceeds according to the technique shown in FIG. 9B. From a start block, the method advances to block 916, in which the environment presentation engine calculates a motion vector for the object based on the motion input. At block 918 the environment presentation engine compares the direction of the gaze vector with the direction of the motion vector. Next, the environment presentation engine calculates vector weighting (e.g., weighting of the gaze vector) based on the comparison. For example, at decision block RG22, the endpoint system 302 determines whether the directions of the gaze vector and the motion vector are similar. If the direction of the gaze vector and the direction of the motion vector are sufficiently similar, the method 900 proceeds to block RG24, in which the environment presentation engine weights the gaze vector more heavily. If the direction of the gaze vector and the direction of the motion vector are not sufficiently similar, the method 900 proceeds to block RG26, in which the environment presentation engine weights the gaze vector less heavily.

The test of whether the vectors are sufficiently similar can vary depending on implementation. In some embodiments, vectors are compared by calculating the dot product of the vectors to determine the angle between them and comparing the angle with a threshold angle e.g., an acute angle such as 20 degrees or 30 degrees. If the angle is less than the threshold, the system can conclude that the motion vector and the gaze vector are sufficiently similar, and weight the gaze vector heavily. If the angle is greater than the threshold, the system can weight the gaze vector less heavily and rely more on the motion vector. At some other, larger threshold angle, such as 90 degrees, the system can conclude that the gaze vector should be ignored.

A similar approach can be taken with more than two vectors being compared. For example, comparisons can be made between the original motion vector of the object, a gaze vector based on head orientation, and a gaze vector based on eye tracking. Vectors can be averaged all together or in subcombinations, compared for similarity as described above, or compared in some other way in order to arrive at a path adjustment.

Referring again to the example shown in FIG. 9B, at block RG28 the environment presentation engine determines a path adjustment for the object based at least in part on motion input and the weighting of the gaze vector. The path adjustment may involve adjusting the direction or trajectory of thrown object, the velocity of the object, or some combination, in order to adjust the path of the object toward the gaze vector or a gazed target. For example, a new trajectory can be calculated for the object that will result in the object landing on or near the target when motion of the object is simulated by the physics engine.

Referring again to FIG. 9A, the method proceeds at block 912, in which a physics engine 510 of the endpoint system 302 simulates motion based at least in part on the path adjustment. In a simplified approach, the method 900 proceeds from procedure block 910 to procedure block 912 without engaging in the detailed vector weighting technique depicted in FIG. 9B. In either case, depending on the nature of the path adjustment, the endpoint system may present (e.g., on a head-mounted display of the endpoint system) the motion of the object in different stages, with a brief transition period between stages. For example, in a first stage, which may begin at or before the release point, the motion of the object is based on original motion parameters (e.g., original direction and velocity). The first stage of natural (unadjusted) flight may be brief relative to the overall flight time of the object (e.g., on the order of a 10 milliseconds or less, or some other period). In the second stage, the simulated motion is based on adjusted parameters (e.g., adjusted direction and velocity).

FIGS. 10A-10D are screenshot diagrams that visually depict illustrative approaches for path adjustment according to aspects of the present disclosure. In these examples, a use 1010 in the physical domain 1000 performs actions that cause an avatar 1020 and an object 1022 to move in a virtual environment 1002. The user 1010 directs her gaze while wearing the HMDD 514, which generates gaze input (e.g., head orientation information, eye-tracking information, or a combination of head orientation and eye-tracking information). The user also moves or manipulates an HCD 518, which generates motion input. An endpoint system (not shown) calculates a gaze vector 1006 based on the gaze input. The gaze vector is depicted as a center line of a viewing frustum 1030. The endpoint system also calculates a motion vector 1004 based on the motion input. The original path 1024 represents the flight path of the object that would occur (as simulated by a physics engine) based on the motion vector 1004 without any path adjustment, whereas the adjusted path 1026 (if present) represents the flight path that would occur with some adjustment based on the gaze vector 1006.

Figure 10A:
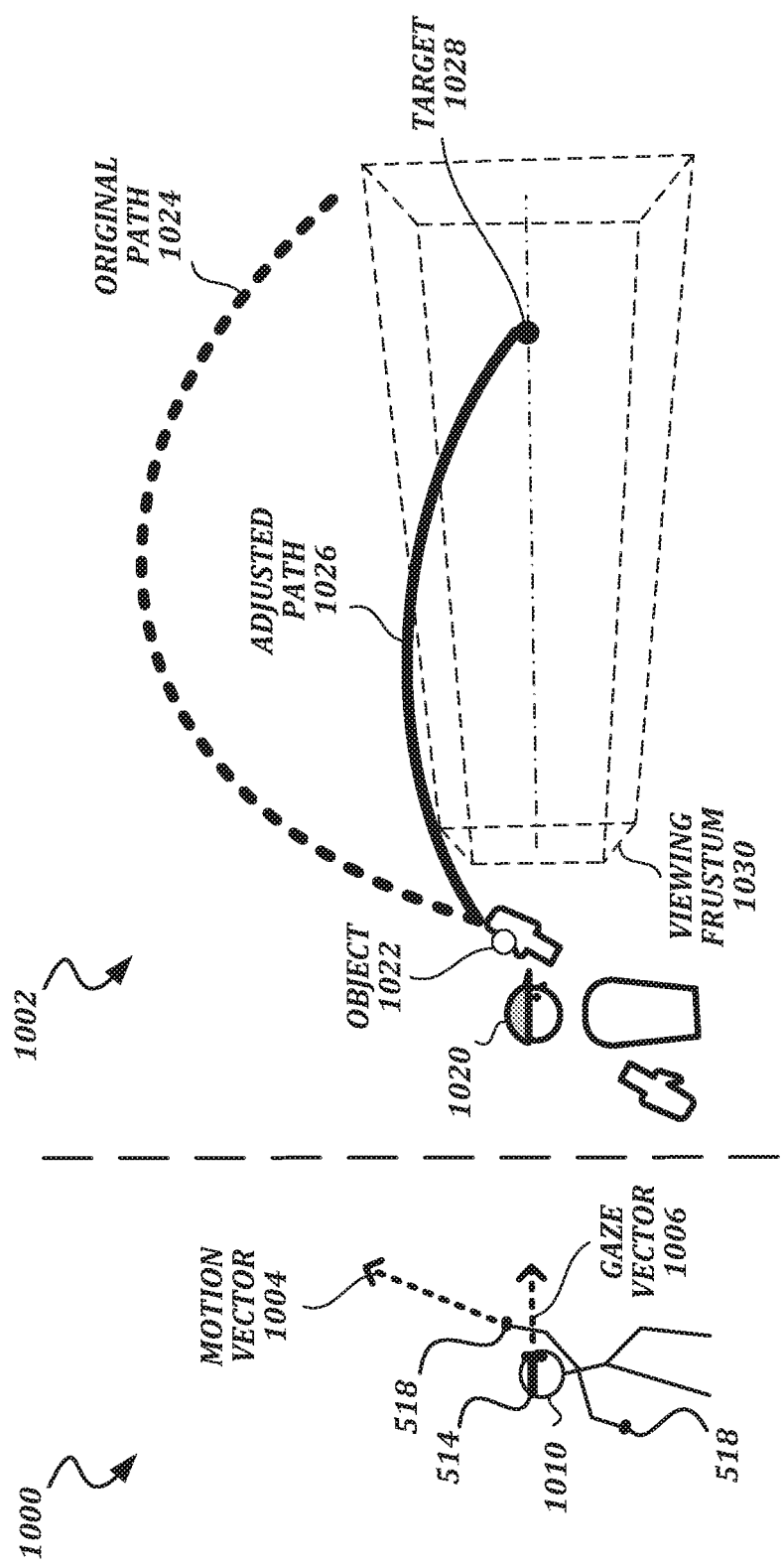
FIGS. 10A-10D are screenshot diagrams that visually depict illustrative approaches for path adjustment according to aspects of the present disclosure.

FIG. 10A depicts a simplified approach in which the gaze vector 1006 is used to determine an adjusted path 1026 of a thrown object 1022. The motion vector 1004 points upward at a steep angle and results in an original path 1024 that is off-target and outside the viewing frustum 1030. However, the center line of the viewing frustum 1030 (corresponding to the gaze vector 1006) is aligned with a target 1028. In this simplified approach, the adjusted path 1026 hits the target 1028 even though there is a large difference between the direction of the gaze vector 1006 and the direction of the motion vector 1004.

Figure 10B:
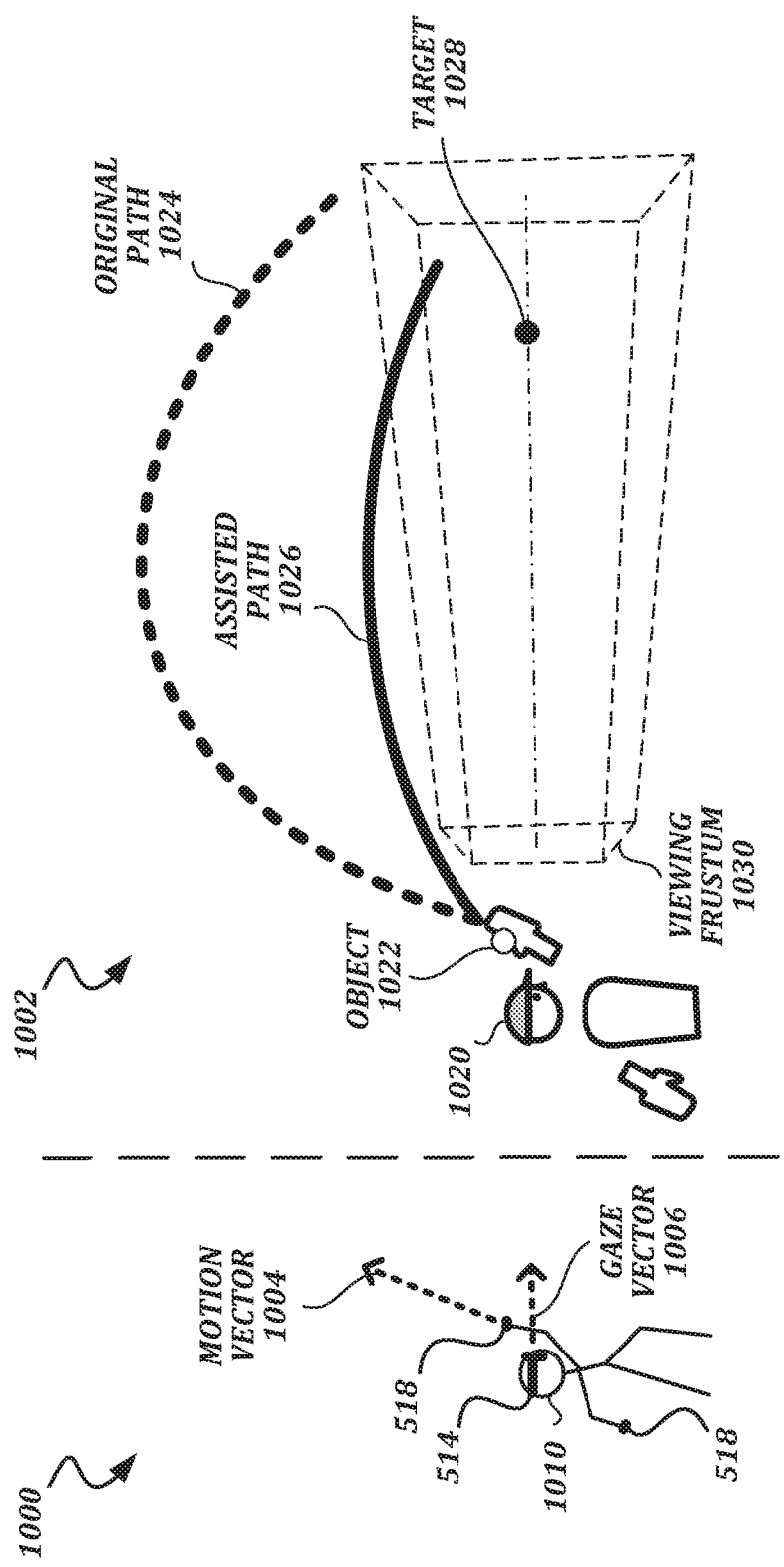
Figure 10C:
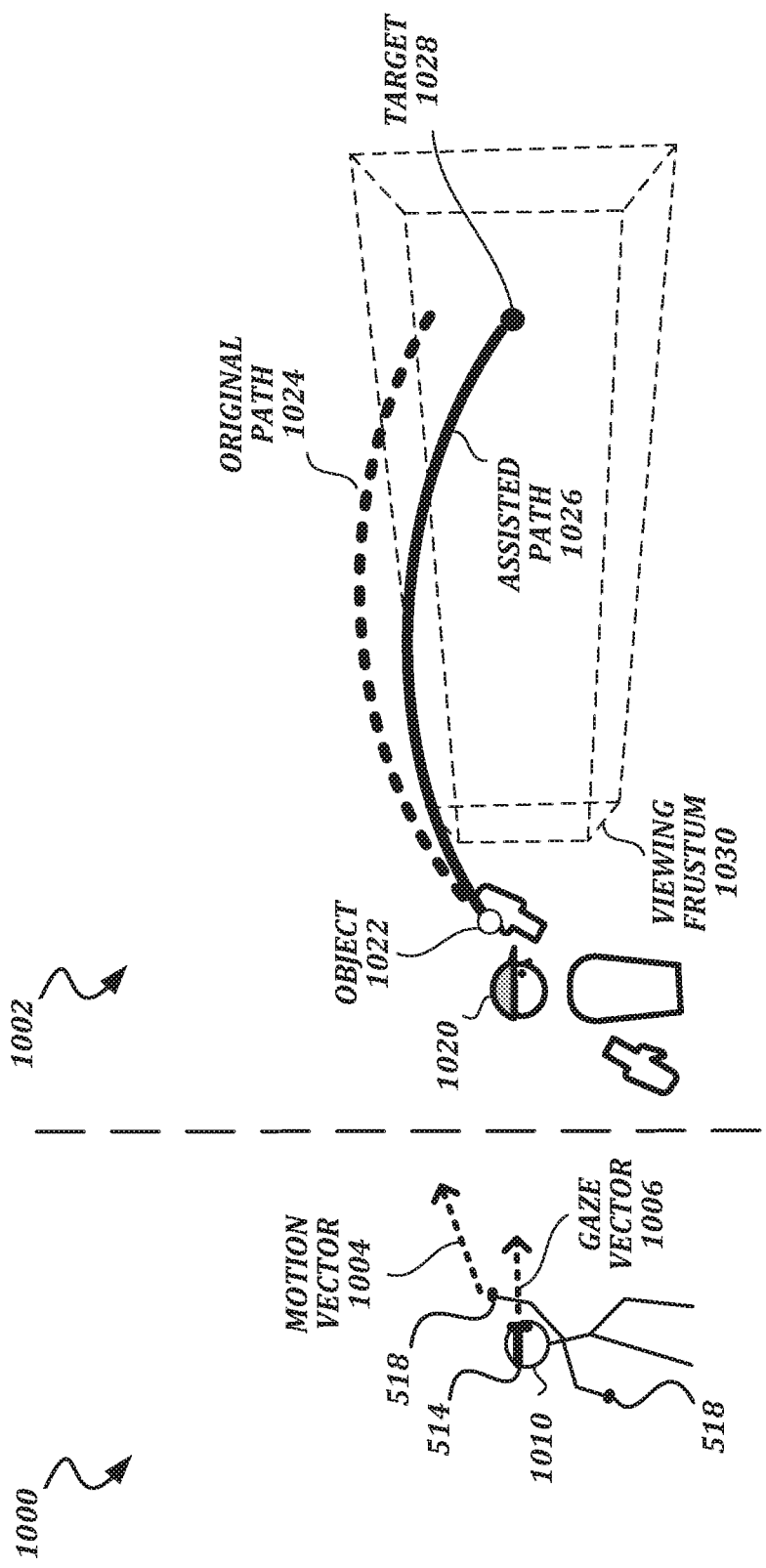
Figure 10D:
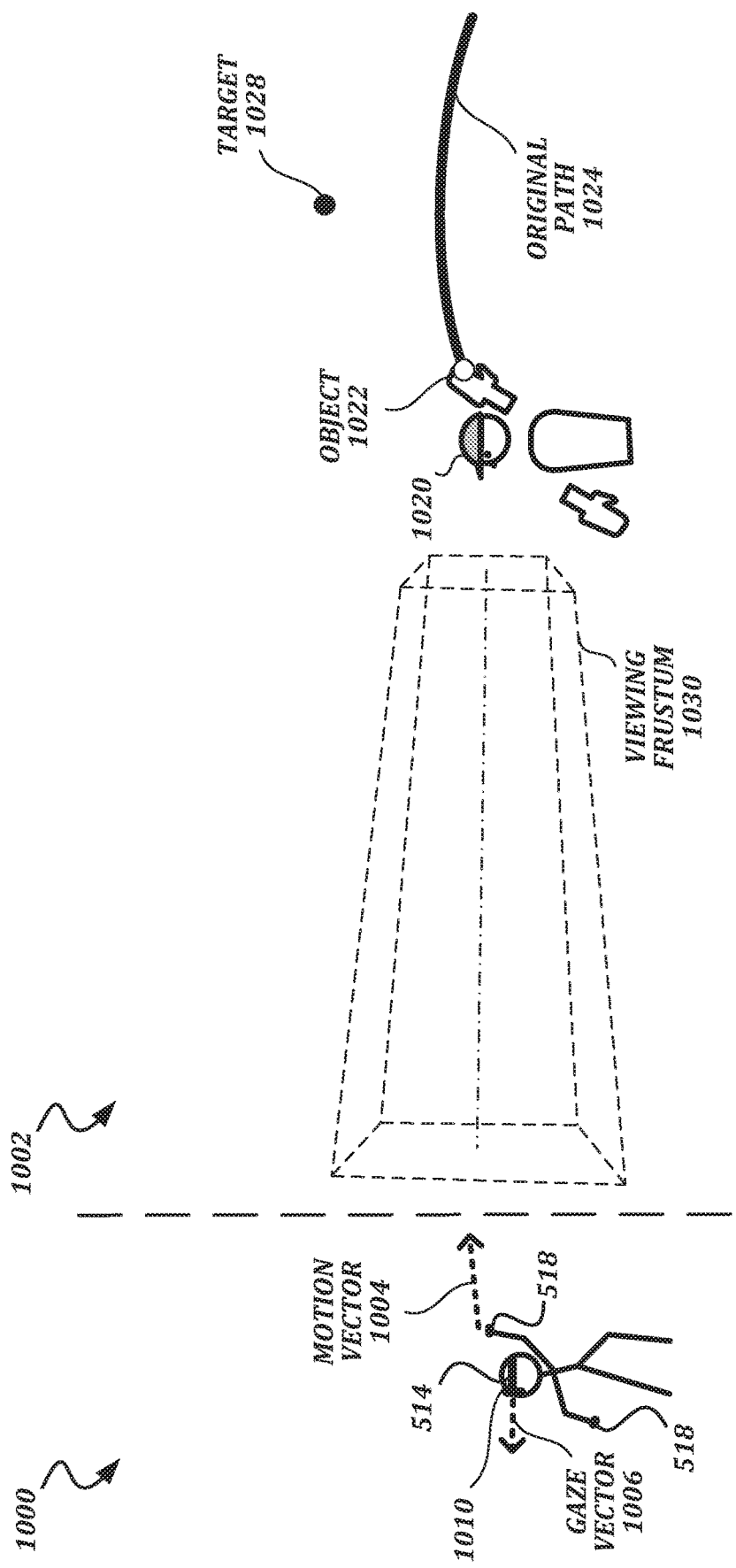

FIGS. 10B, 10C, and 10D depict a more detailed approach involving vector weighting. In the example shown in FIG. 10B, the angle between the gaze vector 1006 and motion vector 1004 is large compared with the corresponding angle in FIG. 10C. Therefore, the direction of the gaze vector 1006 is less heavily weighted FIG. 10B, and the adjusted path 1026 does not hit the target 1028. In the example shown in FIG. 10C, the angle between the gaze vector 1006 and the motion vector 1004 is small compared with the corresponding angle in FIG. 10B. Therefore, the direction of the gaze vector 1006 is more heavily weighted, and the adjusted path 1026 hits the target 1028. FIG. 10D represents a more extreme case in which the gaze vector 1006 and the motion vector 1004 point in nearly opposite directions. This type of scenario may occur, for example, if the user is prevented from looking at the target or is attempting a "no-look" trick shot. In this case, the directions of the vectors are so different that the gaze vector 1004 is ignored completely, and the original path 1024 is used with no adjustment of the motion parameters. In such a scenario, the system may infer that the user's gaze does not reflect the targeting intent of the user.

The illustrative path adjustment techniques described herein are non-limiting. It will be understood that the particular path adjustments to be calculated, as well as the criteria for determining whether a path adjustment should be made, can be implemented in different ways depending on factors such as overall system preferences, bandwidth or processing restrictions, gameplay design, physics engine design, and the like.

Many alternatives to the techniques described above are possible. For example, weighted vectors can include the direction of the head, the direction of the eyes, and the vector of the hand's motion. Additionally, vectors can be weighted over time, e.g., before release, at the moment of release, and a few milliseconds after release. In this type of approach, an overall adjusted vector may be calculated for a thrown object as a combination of these weighted vectors.

The scenarios in which described embodiments may be used are wide ranging, and include a wide variety of actions involving gaze, such as ball games (baseball, basketball, football, soccer, etc.), archery, target shooting, combat with thrown projectiles or virtual firearms, etc. Described embodiments also may be adapted to scenarios that do not involve thrown objects. For example, in a target shooting simulation, a user may hold a virtual rifle in a particular position and orientation in an attempt to shoot a distant target. The virtual projectile may have an original path based on the position and orientation of the virtual rifle as detected by an appropriately configured device. An assisted path can be used to propel the virtual projectile to the target based on the gaze vector or viewing frustum of the user. Described embodiments also may be adapted to scenarios that do not involve hands or arms. For example, in a soccer simulation, a user may kick a virtual ball in an attempt to land the ball near a target on a virtual playing field. The virtual ball may have an original path as determined by foot/leg properties provided by an appropriately configured device, such as a sock or shoe with sensors for detecting foot or leg movements. An assisted path can be used to land the ball at or nearer to the target based on the gaze vector or viewing frustum of the user.

One example of a gaze-assisted application that does not involve thrown objects is presenting a user interface in a virtual environment based on a gaze vector. In at least one embodiment a user is able to cause a menu to be displayed by gazing in the direction of a watch on their avatar's hand.

Figure 11A:
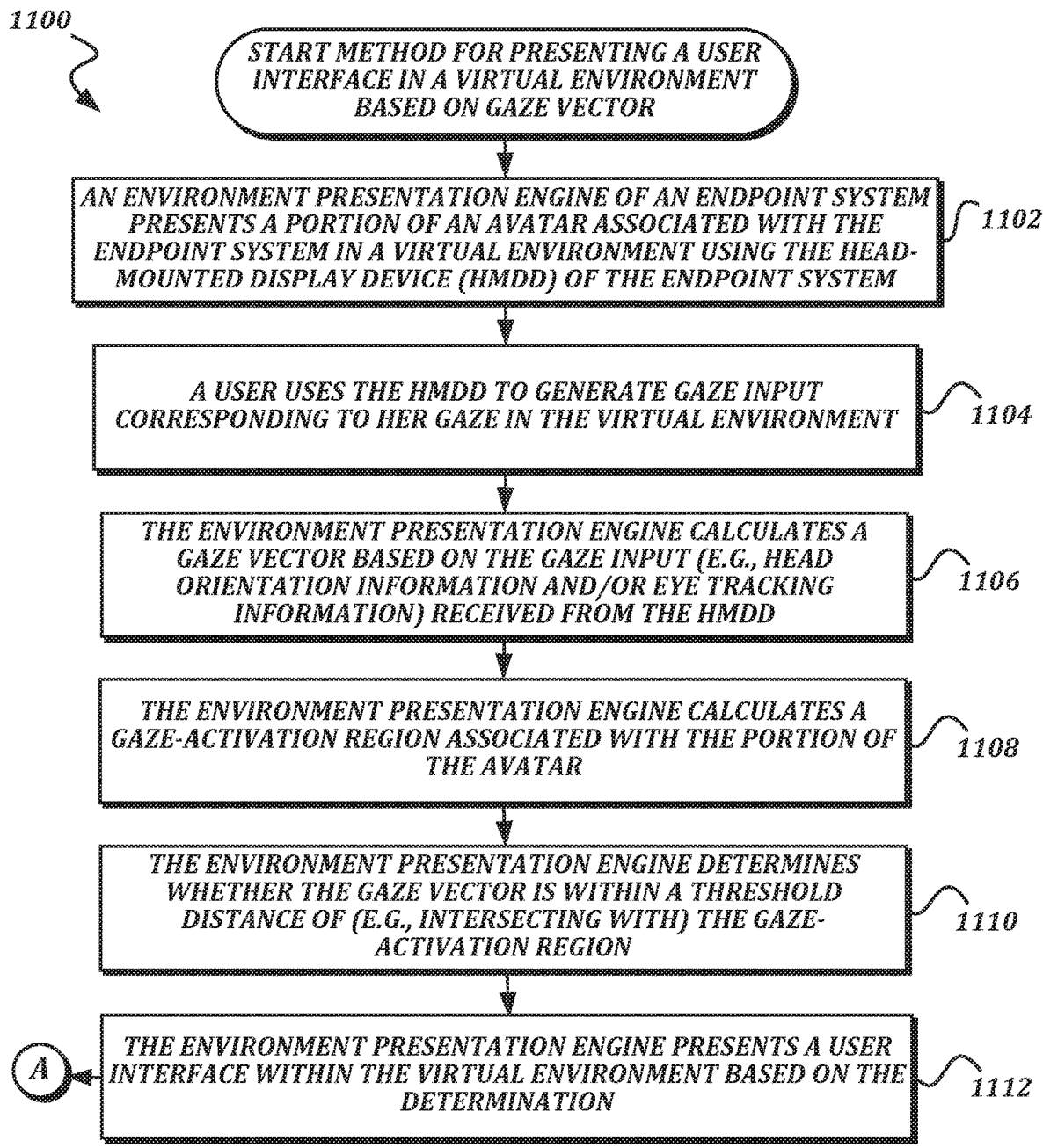
FIGS. 11A-11B are a flowchart that illustrates an example embodiment of a method of presenting a user interface (such as a watch menu) in a virtual environment based on a gaze vector according to aspects of the present disclosure.
Figure 11B:
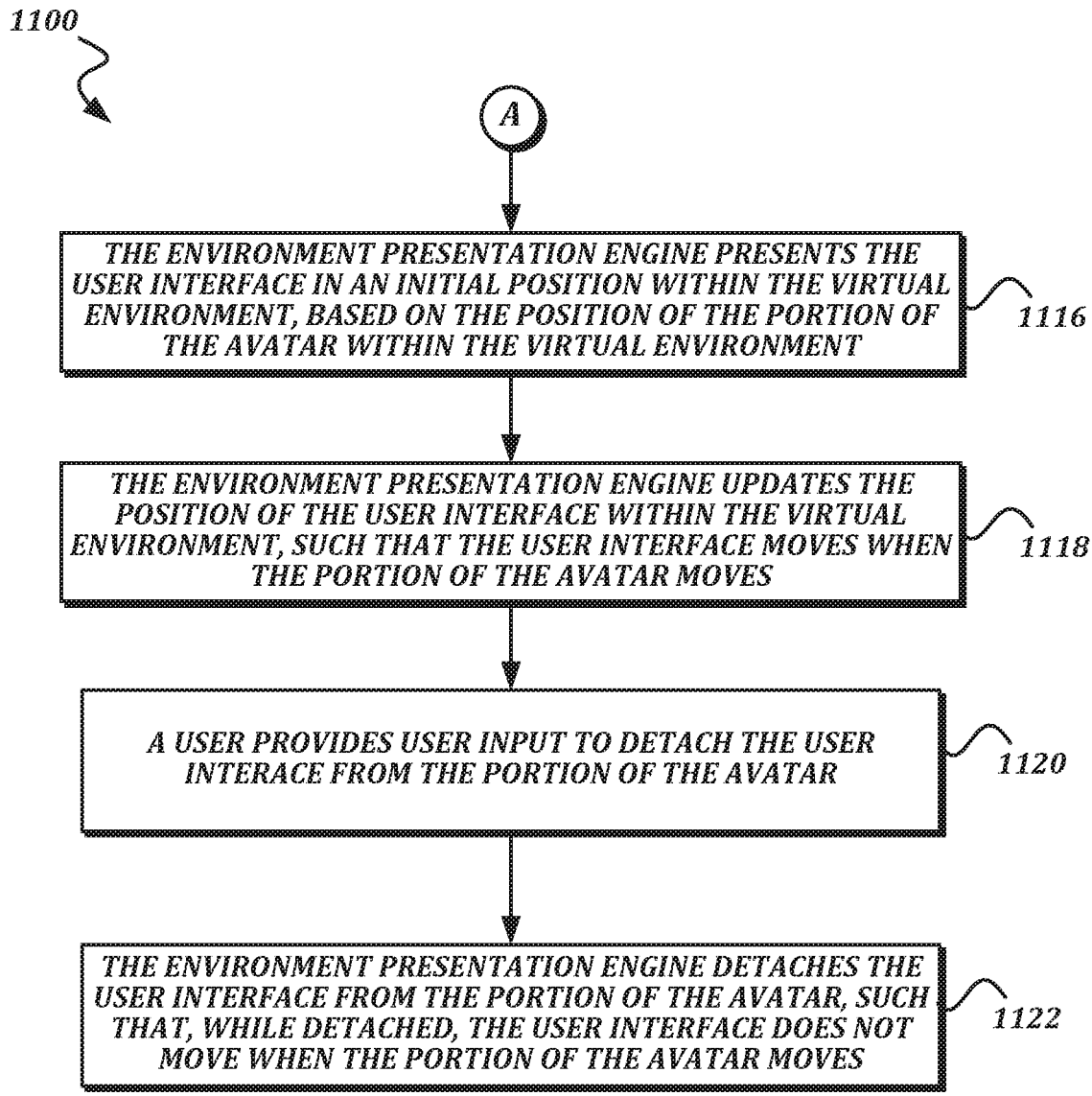

FIGS. 11A-11B are a flowchart that illustrates an example embodiment of a method of presenting a user interface (such as a watch menu) in a virtual environment based on a gaze vector. Although the flowchart of FIGS. 11A-11B refers to hand-oriented features such as watch menus, it should be understood that the techniques described in this flowchart and elsewhere herein may be easily adapted to accommodate actions involving other objects or other parts of avatars.

Referring to FIG. 11A, from a start block the method 1100 proceeds to a procedure block 902, wherein an environment presentation engine of an endpoint system 302 presents a portion of an avatar associated with the endpoint system within the virtual environment, e.g., using the head-mounted display device (HMDD) 514 of the endpoint system. Though not required, the virtual environment may be a shared virtual environment in which multiple avatars are present.

At block 1104, the user generates gaze input (e.g., using the HMDD 514) corresponding to her gaze in the virtual environment. Next, at block 906, the environment presentation engine calculates a gaze vector based on the gaze input, as described above. At block 1108, the environment presentation engine calculates a gaze-activation region associated with the portion of the avatar. For example, the environment presentation engine may determine the location of an avatar's hand and, based on the location, determine that the gaze-activation region is in the location occupied by a wrist portion of the avatar's hand. Within the virtual environment, the gaze-activation region may be represented visually by a distinctive feature, such as a wristwatch, to assist the user in properly targeting her gaze in order to activate the user interface. The gaze-activation region need not be modeled with precise dimensions of the distinctive feature, and may instead be modeled with, for example, a bounding box or sphere of a suitable size that allows for easier calculations and gaze targeting.

At block 1110, the environment presentation engine determines whether the gaze vector intersects or is within a threshold distance of the gaze-activation region. If more precise activation is desired, this step may involve determining whether the gaze vector intersects with the gaze-activation region. Or, if easier activation is desired, this step may permit activation where the gaze vector does not intersect with the gaze-activation region, but is within a threshold distance. At block 1112, the environment presentation engine presents a user interface within the virtual environment based on the result of this determination step.

Figure 12A:
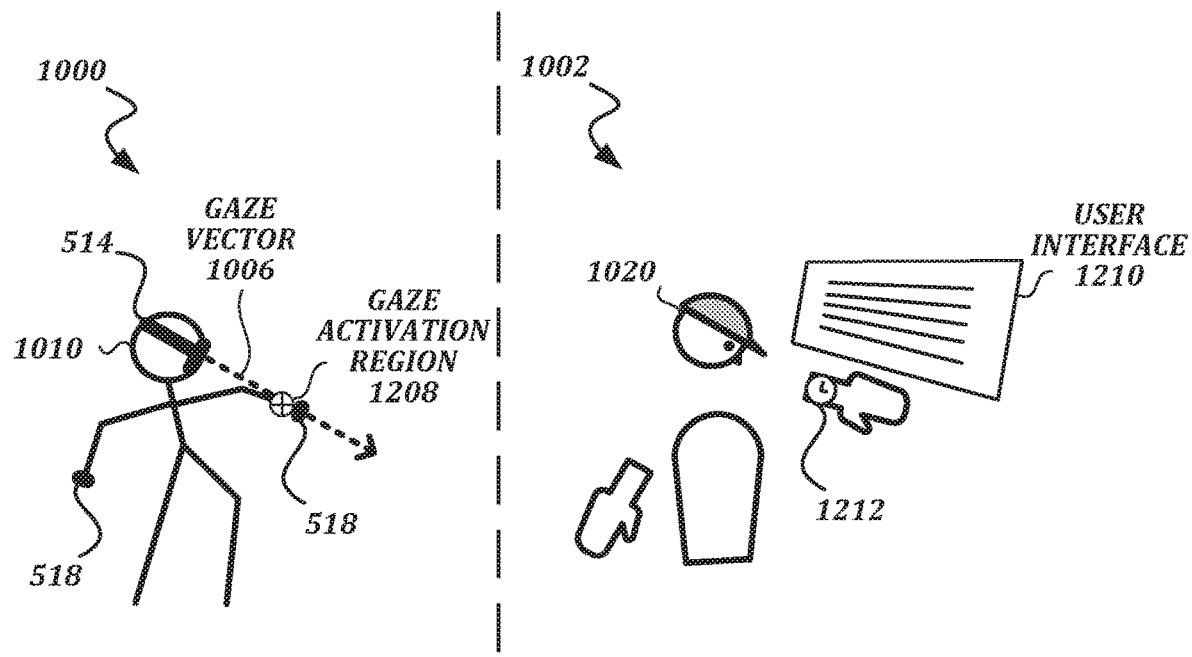
FIGS. 12A and 12B are diagrams that visually depicts the illustrative approaches described in FIGS. 11A and 11B.

FIG. 12A is a diagram that visually depicts the illustrative approach described in FIG. 11A. In this example, a user 1010 in the physical domain 1000 performs actions that cause an avatar 1020 to move in a virtual environment 1002. The user 1010 directs her gaze while wearing the HMDD 514, which generates gaze input (e.g., head orientation information, eye-tracking information, or a combination of head orientation and eye-tracking information). The user also may move or manipulate an HCD 518 to move a hand of the avatar 1020 associated with a gaze-activation region 1208 and a visual feature 1212 (e.g., a watch). An endpoint system (not shown) calculates a gaze vector 1006 based on the gaze input and determines whether the gaze vector intersects with the gaze-activation region 1208. If it does, the endpoint system presents a user interface 1210 in response to detection of the intersection.

Referring again to FIG. 11A, additional functionality may be provided to allow the user interface to be detached from movements of the avatar, which may allow for easier use in some situations. In addition, this example illustrates how presentation of the user interface can be maintained even if the position of the gaze-activation region or the direction of the gaze vector changes. From procedure block 1112, the method 1100 proceeds to continuation terminal A. From terminal A, the method proceeds to block 1116, in which the environment presentation engine presents the user interface in an initial position based on the position of the portion of the avatar (e.g., the avatar's hand) associated with the gaze-activation region. At block 1118, the environment presentation engine updates the position of the user interface such that the user interface moves when the portion of the avatar moves. While the ability to move the user interface may be helpful in some scenarios, it may also be helpful to detach the user interface from the avatar to allow it to remain stationary while the avatar moves or while the user shifts her gaze from the gaze-activation region. At block RK20, the user provides user input (e.g., by actuating a menu button, a trigger button, or the like) to detach the user interface from the portion of the avatar. In response, at block RK22 the environment presentation engine detaches the user interface from the avatar such that, while detached, the user interface does not move and can remain displayed when the portion of the avatar moves, or when the user shifts her gaze.

Figure 12B:
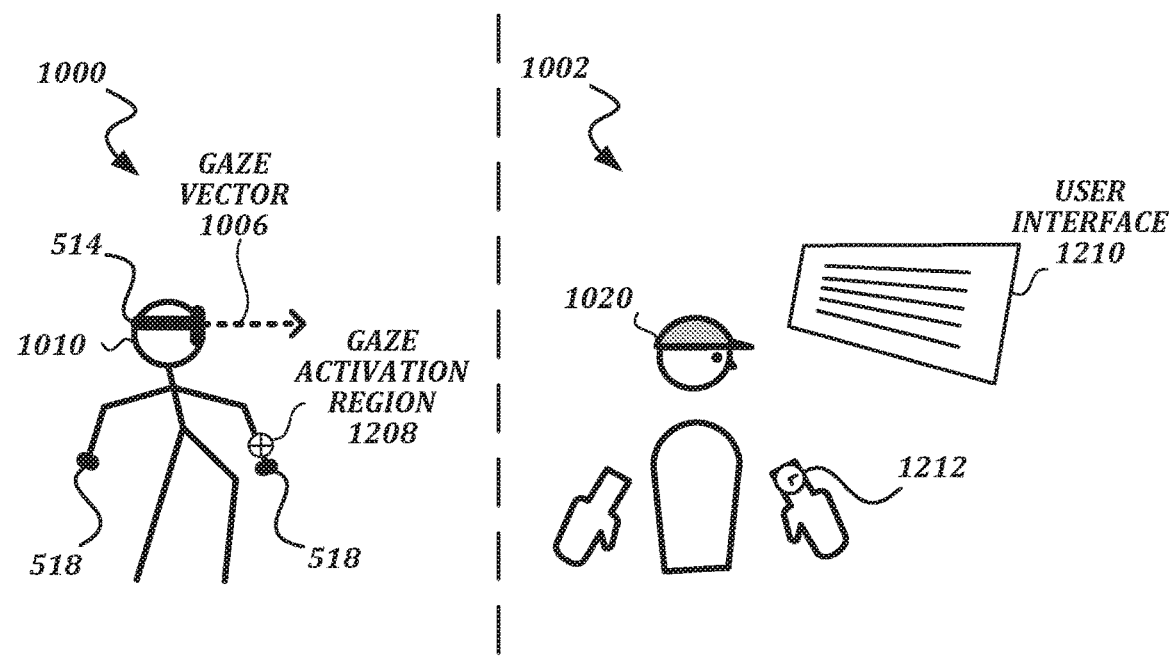

FIG. 12B is a diagram that visually depicts the illustrative approach described in FIG. 11B. In this example, the user 1010 has provided user input (e.g., via an HCD 518) to request detachment of the user interface 1210. The user 1010 has also moved her hand and her head, resulting in a movement of the gaze-activation region 1208 and her gaze vector 1006, such that they no longer intersect. Yet, the user interface 1210 is still displayed and is detached from the hand of the avatar 1020.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system comprising:
an endpoint system including one or more computing devices programmed to:
present an object in a virtual environment;
receive gaze input corresponding to a gaze of a user of the endpoint system;
calculate a gaze vector based on the gaze input;
receive motion input corresponding to an action of the user that causes motion of the object in the virtual environment along an original flight path that is based on the motion input;
simulate motion of the object within the virtual environment based at least in part on the motion input and the gaze vector, wherein the simulated motion comprises a first stage in which the motion of the object follows the original flight path and a second stage in which the motion of the object follows an adjusted flight path that moves toward the gaze vector.

2. The system of claim 1, wherein the one or more computing devices are further programmed to calculate a motion vector based on the motion input, wherein the motion vector includes a direction.

3. The system of claim 2, wherein the motion input comprises hand motion input.

4. The system of claim 2, wherein the gaze vector includes a direction, and wherein the second stage of the simulated motion is based at least in part on a comparison of the direction of the gaze vector and the direction of the motion vector.

5. The system of claim 4, wherein the one or more computing devices are further programmed to calculate weighting of the gaze vector or weighting of the motion vector based on the comparison.

6. The system of claim 5, wherein the object is presented in the virtual environment as being thrown by an avatar associated with the endpoint system.

7. The system of claim 4, wherein the comparison comprises calculating an angle between the directions of the vectors.

8. The system of claim 7, wherein the one or more computing devices are further programmed to calculate weighting of the gaze vector or weighting of the motion vector based on the angle.

9. The system of claim 8, wherein if the angle is greater than a threshold, the gaze vector is ignored.

10. The system of claim 1, wherein the second stage of the simulated motion is based at least in part on whether the gaze vector or a viewing frustum is aligned with a target.

11. A computer-implemented method comprising:
by an endpoint system:
presenting an object in a virtual environment;
receiving gaze input corresponding to a gaze of a user of the endpoint system;
calculating a gaze vector based on the gaze input;
receiving motion input corresponding to an action of the user that causes motion of the object in the virtual environment along an original flight path that is based on the motion input;
and
simulating motion of the object within the virtual environment based at least in part on the motion input and the gaze vector, wherein the simulated motion comprises a first stage in which the motion of the object follows the original flight path and a second stage in which the motion of the object follows an adjusted flight path that moves toward the gaze vector.

12. The method of claim 11, further comprising calculating a motion vector based on the motion input, wherein the motion vector includes a direction.

13. The method of claim 12, wherein the gaze vector includes a direction, and wherein the second stage of the simulated motion is based at least in part on a comparison of the direction of the gaze vector and the direction of the motion vector.

14. The method of claim 11, wherein the second stage of the simulated motion is based at least in part on whether the gaze vector or a viewing frustum is aligned with a target.

15. One or more non-transitory computer-readable media having stored thereon computer-executable instructions configured to cause one or more computing devices to perform steps comprising:
presenting an object in a virtual environment;
receiving gaze input corresponding to a gaze of a user;
calculating a gaze vector based on the gaze input;

receiving motion input corresponding to an action of the user that causes motion of the object in the virtual environment along an original flight path; and simulating motion of the object within the virtual environment based at least in part on the motion input and the gaze vector, wherein the simulated motion comprises a first stage in which the motion of the object follows the original flight path and a second stage in which the motion of the object follows an adjusted flight path that moves toward the gaze vector.

16. The non-transitory computer-readable media of claim 15, the steps further comprising calculating a motion vector based on the motion input, wherein the motion vector includes a direction.

17. The non-transitory computer-readable media of claim 16, wherein the gaze vector includes a direction, and wherein the second stage of the simulated motion is based at least in part on a comparison of the direction of the gaze vector and the direction of the motion vector.

18. The non-transitory computer-readable media of claim 17, the steps further comprising calculating weighting of the gaze vector or weighting of the motion vector based on the comparison.

19. The non-transitory computer-readable media of claim 17, wherein the comparison comprises calculating an angle between the directions of the vectors, the steps further comprising calculating weighting of the gaze vector or weighting of the motion vector based on the angle.

20. The non-transitory computer-readable media of claim 15, wherein the second stage of the simulated motion is based at least in part on whether the gaze vector or a viewing frustum is aligned with a target.

* * * * *